US008677352B2

United States Patent
Hiltgen et al.

(10) Patent No.: US 8,677,352 B2
(45) Date of Patent: Mar. 18, 2014

(54) INTERCHANGEABLE GUEST AND HOST EXECUTION ENVIRONMENTS

(75) Inventors: Daniel Hiltgen, San Jose, CA (US); Rene W. Schmidt, Risskov (DK)

(73) Assignee: VMware, Inc., Palo Alto, CA (US)

( * ) Notice: Subject to any disclaimer, the term of this patent is extended or adjusted under 35 U.S.C. 154(b) by 1318 days.

(21) Appl. No.: 12/167,874

(22) Filed: Jul. 3, 2008

(65) Prior Publication Data
US 2009/0113423 A1 Apr. 30, 2009

Related U.S. Application Data

(60) Provisional application No. 60/984,304, filed on Oct. 31, 2007.

(51) Int. Cl.
*G06F 9/455* (2006.01)
*G06F 9/46* (2006.01)

(52) U.S. Cl.
USPC ............................................. 718/1; 718/104

(58) Field of Classification Search
USPC ........................................ 718/1, 100, 102, 104
See application file for complete search history.

(56) References Cited

U.S. PATENT DOCUMENTS

| | | | |
|---|---|---|---|
| 6,178,503 B1 * | 1/2001 | Madden et al. ................ | 713/2 |
| 7,082,598 B1 | 7/2006 | Le et al. | |
| 7,725,893 B2 * | 5/2010 | Jaeckel et al. ................ | 718/1 |
| 7,769,720 B2 * | 8/2010 | Armington ................ | 707/654 |
| 8,086,836 B2 * | 12/2011 | Chong et al. ................ | 713/2 |
| 8,555,017 B2 * | 10/2013 | McCann ................ | 711/165 |
| 8,561,063 B2 * | 10/2013 | Jaeckel et al. ................ | 718/1 |
| 2003/0093658 A1 * | 5/2003 | Wen et al. ................ | 713/1 |
| 2003/0154337 A1 * | 8/2003 | Ohno et al. ................ | 710/260 |
| 2003/0191911 A1 * | 10/2003 | Kleinschnitz et al. ........ | 711/154 |
| 2005/0229175 A1 * | 10/2005 | McCrory et al. ............. | 717/177 |
| 2006/0089995 A1 * | 4/2006 | Kerr et al. ................ | 709/227 |
| 2008/0022068 A1 * | 1/2008 | Taillefer ................ | 711/202 |
| 2009/0037909 A1 * | 2/2009 | Xu ................ | 718/1 |
| 2009/0119778 A1 * | 5/2009 | Bhuyan ................ | 726/25 |

OTHER PUBLICATIONS

InfoWorld Virtualization Report "VMware isn't the only New Converter Tool in Town", http://weblog.infoworld.com/virtualization archives/2007/01/vmware_isnt_the.html, Jan. 31, 2007, 2 pages.

(Continued)

*Primary Examiner* — Emerson Puente
*Assistant Examiner* — Willy W Huaracha

(57) ABSTRACT

Embodiments of the present invention include methods, systems, apparati, computer program products and other tangible realizations of techniques to support interchange of role for guest and host operating system instances executed (or executable) within a virtualization system. In particular, one embodiment of the present invention is a method operating a computer system, the method comprising: (a) selecting a first operating system image from amongst plural operating system images accessible to a hardware machine; (b) booting the hardware machine using the first operating system image and executing code thereof as a host operating system; (c) providing a virtualization environment and instantiating therein a virtual machine using configuration data descriptive of a particular system virtualized, wherein the configuration data is stored separately from the first operating system image; and (d) loading from a second one of the operating system images, a guest operating system and executing code thereof in connection with the instantiated virtual machine.

44 Claims, 11 Drawing Sheets

(56) References Cited

OTHER PUBLICATIONS

Vance, Ashlee, "VMware wallops Microsoft with white paper", The Register, Feb. 26, 2007, 4 pages, http://www.theregister.co.uk/2007/02/26/vmware_ms_spat/print.html.

Neiger, Gil et al., "Intel Virtualization Technology: Hardware Support for Efficient Processor Virtualization", Intel Technology Journal, vol. 10, Issue 3, Aug. 10, 2006, pp. 167-178.

VMware Converter 3, Product Datasheet, VMware, 2007, 2 pages.

VMware Technical Note, "Virtual Machine to Physical Machine Migration", 1998-2004, pp. 1-22.

EasyVMXI:.vmx Config Generator, "EasyVMXI: Create Virtual Machine", 2 pages, http://www.easyvmx.com/cgi-bin/vmcreate.cgi?filetime=2006-11-29-22%3A18T3A36&vmname=M . . . .

VMware Technology Network, VMware Workstation 4.5, "Configuring Dual- or Multiple-Boot Systems to Run with VMware Workstation", 3 pages, http://www.vmware.com/support/ws45/doc/disks_dualmult_ws.html.

VMware Technology Network, VMware Workstation 4.5, "Installing an Operating System onto a Raw Partition from a Virtual Machine", 3 pages, http://www.vmware.com/support/ws45/doc/disks_instraw_ws.html.

VMware PV2 Assistant Product Datasheet, "Utility for physical-to-virtual machine migration", 2006, 2 pages.

InfoWorld Virtualization Report, "VMware Making P2V Easier with VMware Converter 3", Jan. 29, 2007, 2 pages, http://weblog.infoworld.com/virtualization/archives/2007/01/vmware_making_p.html.

VMware Technical Note, "VMware Virtual Disks Virtual Disk Format 1.0", 1998-2006, pp. 1-13.

\* cited by examiner

INTERCHANGEABLE GUEST AND HOST EXECUTION ENVIRONMENTS

CROSS-REFERENCE TO RELATED APPLICATION(S)

This application claims the benefit of U.S. Provisional Application No. 60/984,304, filed Oct. 31, 2007.

In addition, this application is related to commonly-owned, co-pending U.S. patent application Ser. No. 12/051,664, filed on Mar. 19, 2008, entitled "IN-PLACE CONVERSION OF VIRTUAL MACHINE STATE," and naming Hiltgen and Schmidt as inventors.

BACKGROUND

Virtualization techniques have a long history in the development of hardware and software systems. Virtual memory, virtual (in-memory) disk storage, and operating system virtual machines are but a few examples of techniques that have long been employed in conventional computational systems. Generally, virtualization techniques seek to abstract underlying resources from layers of functionality (typically software) that employ the resources. Today, partitioning a physical resource for presentation (to multiple resource consumers) as an isolated, but functionally complete instance of the virtualized resource is employed in many modern software systems, including modern operating systems.

While virtualization has long been employed as a method for partitioning individual resources (e.g., in virtual memory or for multi-threaded software executed on a single preemptively scheduled processor), in recent years, virtualization techniques have been employed on a more comprehensive scale. As a result, commercially-available virtualization systems (such as those available from VMware, Microsoft and XenSource) seek to virtualize hardware systems more completely, for example, by presenting an operating system or other software system with a virtualization of underlying hardware.

Virtualization technology has proven useful in both personal and shared computing environments. For example, in data center deployments, virtualization technology facilitates server consolidation and has been used for server replication, downtime management, fault tolerance and disaster recovery. At the desktop, laptop or workstation, virtualization technology has been used to provide support multiple operating system instances and/or virtual machines. For example, support for concurrent execution of multiple operating system and/or virtual machines instances can provide a user, on a single machine, with capabilities normally associated with two or more dissimilar computer systems, e.g., a Microsoft® Windows based personal computer and an iMac® computer running OS X. Microsoft Windows is a trademark of Microsoft Corporation. iMac is a trademark of Apple Computer, Inc.

Often, a virtualization system is hosted as software whose execution is coordinated by a first operating system executing on underlying hardware. The virtualization system exposes resources of the underlying hardware as at least one virtual machine. The virtual machine, in turn, supports execution of a second operating system. Typically, in such configurations, the first operating system is referred to as a host operating system and the second as a guest operating system. Thus, a user that needs or wants access to facilities of two different operating systems (or supported applications) might configure his/her workstation to run both host and guest operating system instances using virtualization technology. In such case, the host operating system more directly interfaces with the hardware machine, while the guest operating system typically incurs at least some additional overhead running within a virtual machine. Improved techniques and flexibility are desired.

SUMMARY

Embodiments of the present invention include methods, systems, apparati, computer program products and other tangible realizations of techniques to support interchange of role for guest and host operating system instances executed (or executable) within a virtualization system. In particular, one embodiment of the present invention is a method operating a computer system, the method comprising: (a) selecting a first operating system image from amongst plural operating system images accessible to a hardware machine; (b) booting the hardware machine using the first operating system image and executing code thereof as a host operating system; (c) providing a virtualization environment and instantiating therein a virtual machine using configuration data descriptive of a particular system virtualized, wherein the configuration data is stored separately from the first operating system image; and (d) loading from a second one of the operating system images, a guest operating system and executing code thereof in connection with the instantiated virtual machine.

BRIEF DESCRIPTION OF THE DRAWINGS

FIG. 7A illustrates an encoding in which separate metadata partitions are maintained for virtual machine instances for use when a corresponding operating system image is instantiated as a guest operating system. FIG. 7B illustrates an alternative configuration in which metadata for two or more virtual machine instances are stored in a common partition. Finally, FIG. 7C illustrates a number of possible distributions of operating system image and metadata to storage volumes.

DETAILED DESCRIPTION

Figure 1:
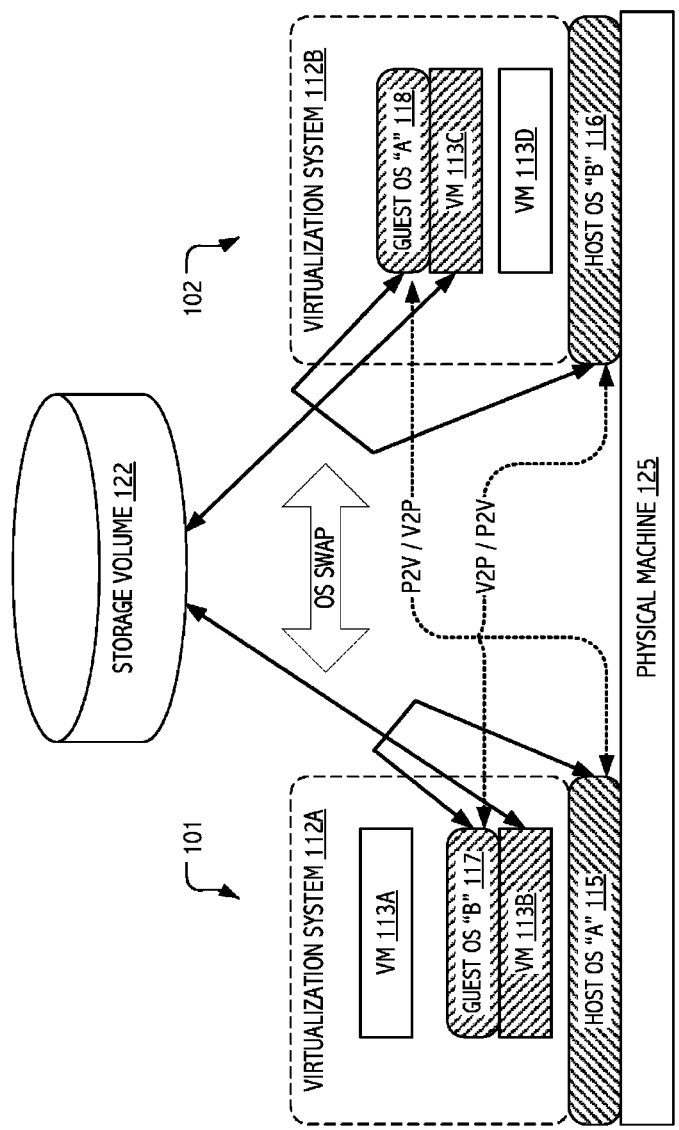
FIG. 1 illustrates a swap or interchange of guest and host operating system instances in accordance with one or more embodiments of the present invention.

One or more embodiments of the present invention are methods for supporting an interchange of role for guest and host operating system instances executed (or executable) within a virtualization system. Thus, in a hosted virtualization system that exposes a single virtual machine, some embodiments of the present invention facilitate the interchange (or swap) of guest and host operating system instances such that an operating system instance previously executed as a guest on a virtual machine instead executes as the host, and an operating system instance previously executed as the host is executed instead as a guest operating system on a virtual machine. One or more embodiments support such an interchange while avoiding the commingling of virtual machine metadata with host operating system state which in turn facilitates or allows isolation and encapsulation strategies that can enhance information security and may be important in some deployments. In addition, some embodiments are scalable to interchangeable configurations of three (3) or more operating system instances.

In one or more embodiments in accordance with the present invention, operating system images can be encoded and/or augmented in ways that facilitate interchangeability of corresponding guest and host operating system instances while maintaining or propagating configurational state across such an interchange. Thus, in one example, operating system instances employed in guest and host roles respectively may swap roles. In one example, the swap can be facilitated by in-place conversions that accommodate dissimilar virtual and physical machines. In some cases, coding techniques are employed for virtual machine metadata which facilitate encapsulation, portability and/or scalability of the described methods to embodiments in which three or more operating system instances are supported.

In one or more embodiments, an encoding of two (or more) operating system images may be transported between (or accessible by) two or more alternative physical machines such that guest and host roles employed on a first machine can be swapped (or interchanged) when executed on an alternative machine. For example, such an encoding may support an office configuration in which a Microsoft Windows operating system hosts an OS X guest operating system, but when copied, transported to or accessed from home (e.g., on removal media or through shareable storage) supports a swapped role configuration in which the OS X operating system instance hosts the Microsoft Windows instance as guest operating system.

Using the described techniques, flexible computational systems can be developed in which multiple operating system images are maintained and individual images are selected for execution either as the host operating system (on an underlying hardware machine) or as a guest operating system (on an exposed virtual machine). In some configurations, flexible options are presented to a computer system user as a multiplicity of boot options, as in a multiboot manager. In some configurations, a storage extent that encodes the multiple operating system images is transported (or transportable) amongst (or accessed or accessible by) multiple computer systems.

For example, in some embodiments of the present invention, a first operating system instance may execute natively (e.g., as host) on a first computer system while supporting a second operating system instance as a guest within an exposed virtual machine. The second operating system instance may then be executed as the host (i.e., natively) on the second computer system, while the first operating system instance is executed as a guest within an exposed virtual machine. Although it is not essential that underlying hardware configurations of the multiple computer systems differ in any significant way, one class of exploitations involves differing physical machine configurations. For example, the configuration exposed by a virtual machine executing on the first computer system may closely correspond to the hardware configuration of the second computer system, and similarly the configuration of a virtual machine on the second computer system may closely correspond to that of the second computer system.

Thus, one example is an office computer configuration in which a Microsoft Windows operating system hosts a virtual machine in which an OS X guest operating system executes, and when storage encoding the respective images is transported to or accessed from home (e.g., on removal media or through shareable storage) a home computer system is executed in a swapped role configuration in which the OS X guest operating system instance hosts a virtual machine in which the Microsoft Windows instance executes as a guest operating system. Persons of ordinary skill in the art will, of course, appreciate a wide range of additional exploitations and guest/host interchange scenarios based on the description herein.

In general, embodiments may use or include encodings of virtual machine data that employ any of a variety of underlying storage technologies, including local disk storage, network storage (including storage area network (SAN) mediated storage and network attached storage technologies), even portable and/or removable media. Using virtual-to-physical (V2P) techniques, it is possible to dynamically convert operating system images for an instance previously executed within a virtual machine (i.e., as a guest) into a form that may be booted or loaded on a physical machine. Similarly, operating system images for an instance previously executed on a hardware machine (e.g., as a host) may, in general, be converted for execution in a virtual machine using physical-to-virtual (P2V) techniques.

In some embodiments, methods allow a virtualization system to expose data that encodes an operating system partition, while still securing sensitive virtual machine metadata such as that which encodes swap state, virtual hardware configuration and/or snapshot or checkpoint states. Typically, such metadata includes backing state data corresponding to internal states of devices, memory and other system components virtualized by or for a given virtual machine. As such, even read access to such metadata (e.g., by a guest) can leak or compromise sensitive information, while write access may afford malicious code or users with an attractive vector for attack. Using encapsulation techniques, it is possible to encode virtual machine state in a way that provides isolation and/or security for certain types or portions of the virtual machine state data, while still allowing a virtualization system to expose other types or portions of such data to a guest application or operating system. Accordingly, in some embodiments, P2V and V2P transformation may operate on encapsulated and de-encapsulated operating system images consistent with the in-place conversions described in commonly-owned, co-pending U.S. patent application Ser. No. 12/051,664, filed on Mar. 19, 2008, entitled "IN-PLACE CONVERSION OF VIRTUAL MACHINE STATE," and naming Hiltgen and Schmidt as inventors, which is incorporated herein by reference. Nonetheless, for simplicity of description and without loss of generality, the description herein is typically without regard to whether, in any particular embodiment, encapsulation operating system image and metadata are employed for any particular virtual machine.

Many embodiments of the present invention will be understood in the context of personal computers or workstations and storage volumes (often local disks or removable media) commonly employed thereby. Nonetheless, some embodiments in accordance with the present invention, particularly cluster-organized and/or enterprise scale systems may build upon or exploit data distribution, replication and management features of modern network storage technology, including storage virtualization, storage area networks (SANs), network attached storage (NAS), etc. In some embodiments, particularly those that employ SAN-type storage arrays, block-level I/O access to virtual machine state data can afford significant performance advantages. Similarly, in some embodiments, non-commingled, encapsulated representations of virtual machine state can be advantageously maintained in distinct storage volumes (or LUNs) of a SAN, such as described in greater detail in commonly-owned, co-pending U.S. patent application Ser. No. 11/960,524, filed Dec. 17, 2007, entitled "SECURING VIRTUAL MACHINE DATA," naming Hiltgen and Schmidt as inventors, which is incorporated herein by reference. Nonetheless, for simplicity of description and without loss of generality, embodiments of the present invention are described primarily without regard to any particular storage technologies.

Finally, for concreteness, implementations are described herein based on facilities, terminology and operations typical of certain processor architectures and systems, and based on terminology typical of certain operating systems, virtualization systems, storage systems and network protocols and/or services. That said, the described techniques are general to a wide variety of processor and system architectures (including both single and multi-processor architectures based on any of a variety of instruction set architectures), to numerous operating system implementations and to systems in which both conventional and virtualized hardware may be provided. As described herein, the techniques are also general to a variety of storage architectures, including storage virtualization systems such as those based on storage area network (SAN) or network attached storage (NAS) technologies, as well as storage architectures that employ local disk media, removable media, etc.

Accordingly, in view of the foregoing and without limitation on the range of underlying processor, hardware or system architectures, operating systems, storage architectures or virtualization techniques that may be employed in realizations of the present invention, techniques are described primarily in the context of certain exemplary realizations. Based on these exemplary realizations, and on the claims that follow, persons of ordinary skill in the art will appreciate a broad range of suitable implementations and exploitations.

Interchange of Guest and Host Operating System Instances

Users of virtualization technology may wish to operate, at certain times, with a first host/guest configuration, while at other times, with a second host/guest configuration. For example, a user may wish to run a Microsoft® Windows operating system as his/her host operating system while supporting (through virtualization technology) a pair a virtual machines running Mac® OS X and Red Hat Linux as respective guest operating systems. At a later time, in a different situation or on different underlying hardware, the user may instead wish to run OS X as the host operating system and support Microsoft® Windows and/or Linux as guest operating systems. At still another time, in another situation or on other hardware, the user may instead wish to run Linux or a Solaris® operating system as the host, and support Microsoft® Windows and/or OS X as guest operating systems. Indeed, persons of ordinary skill in the art will appreciate many permutations based on the description herein. Microsoft Windows is a trademark of Microsoft Corporation, Mac is a trademark of Apple Inc., and Solaris is a trademark of Sun Microsystems, Inc.

Although a user could conceivably configure a single system with two alternative boot configurations, one executing a first instance of a Microsoft Windows operating system as host and a first instance of OS X as guest, and another with a second instance of OS X as host and a second instance of Microsoft Windows as guest, such a configuration may not be entirely satisfactory. For example, the user may wish to effectuate such a change without losing configuration state for the operating system instances despite a change in role, e.g., from guest-to-host or host-to-guest. Furthermore, any techniques employed to facilitate propagation of configurational state would preferably (i) be scalable to situations in which three (3) or more operating system images are supported and/or (ii) facilitate segregation of virtual machine metadata from a host operating system image. Accordingly, simplistic multi-boot adaptations of conventional virtualization techniques are less than ideal.

One or more embodiments are described by which operating system images can be encoded and/or augmented in ways that facilitate interchangeability of corresponding guest and host operating system instances while maintaining or propagating configurational state across such an interchange. Thus, in some embodiments in accordance with the present invention, operating system instances employed in guest and host roles respectively may swap roles by performing any necessary conversion of an operating system image in-place. In some cases, the in-place conversions may accommodate dissimilar virtual and physical machines, while in others, virtual machine configurations may closely align with the configuration of a physical (hardware) machine. In some cases, coding techniques are employed for virtual machine metadata which facilitate encapsulation, portability and/or scalability of the described techniques to embodiments in which three or more operating system instances are supported.

Some embodiments in accordance with the present invention will be understood with reference to FIG. 1 where pre- and post-swap relationships among operating system instances are illustrated. In a first (pre-swap) arrangement 101, operating system "A" runs as a host operating system 115 on underlying hardware (physical machine 125). Virtualization software (e.g., any of the hosted virtualization software products of VMware, Inc.) runs as virtualization system 112A in coordination with host operating system 115 (here an instance of operating system "A"). Virtualization system 112A exposes two virtual machines (VMs 113A and 113B), one of which, VM 113B, runs an instance of operating system "B" as guest operating system 117. As explained in greater detail elsewhere herein, storage volume 122 encodes images of both operating system "A" and operating system "B" and encodes virtual machine metadata that describes the configuration of VM 113B exposed by virtualization system 112A.

In a second (post-swap) arrangement 102, operating system "B" instead runs as the host operating system 116 on the same underlying physical machine 125. As before, virtualization software runs in coordination with the host operating system (here, an instance of operating system "B") as virtualization system 112B. Virtualization system 112B exposes two virtual machines (VMs 113C and 113D), one of which, VM 113C, runs an instance of operating system "A" as guest operating system 118. As before, storage volume 122 encodes images of both operating system "A" and operating system "B." Thus, the image of operating system "A" used to boot physical machine 125 and instantiated as host operating system 115 in arrangement 101 is also the image instantiated as guest operating system 118 in arrangement 102. Similarly, the image of operating system "B" instantiated as guest operating system 117 in arrangement 101 is also the image used to boot physical machine 125 and instantiated as host operating system 116 in arrangement 102. In the illustrated configuration, storage volume 122 also encodes virtual machine metadata that describes the configuration of at least VMs 113B and 113D.

Since, except for any appropriate in-place transformations, it is the same image that is booted (in one arrangement) as a host operating system and loaded (in the other arrangement) as a guest operating system, configurational state, e.g., device selections and configurations, registry entries, user configurations, network addresses, etc., may all be conveyed across a physical-to-virtual (P2V) or virtual-to-physical (V2P) transition. Note that, although FIG. 1 has been described in accordance with an arrangement 101 to arrangement 102 transition, the reverse is also supported. Accordingly, persons of ordinary skill in the art will understand the techniques described herein as generally supportive of bi-directional P2V and V2P role changes and related role swaps for operating system images. Although the scenario described with reference to FIG. 1 involves only two operating system images, based on other description herein, persons of ordinary skill in the art will appreciate the utility of the described techniques for scenarios in which role permutations for three (3) or more operating system images are desired.

In-place physical-to-virtual (P2V) or virtual-to-physical (V2P) transformations of operating system images may be necessary (or desirable) in some implementations or for some situations in which characteristics of underlying physical machine 125 and exposed virtual machines (e.g., VMs 113B and 113C) differ significantly. Indeed, such transformations are described in greater detail elsewhere herein. Nonetheless, in many deployments, P2V and V2P transformations of a given operation system image will be minimal or even nonexistent, particularly for virtualization system deployments in which configurations of exposed virtual machines (e.g., type and numbers of processors virtualized, type of virtual network adapter, amount of memory virtualized, type of host bus adapter, etc. of VMs 113B and 113C) closely mimic resources provided by underlying hardware (e.g., physical machine 125) or in which the particular operating systems deployed support run-time adaptation to particular hardware.

Finally, as a practical matter, software implementing virtualization system 112B is typically identical to that implementing virtualization system 112A, although minor configurational differences or variations to conform to the underlying host operating system (e.g., different drivers, memory management internals, etc.) are possible. That said, nothing in developed techniques necessarily requires that virtualization systems 112A and 112B be the same. Indeed, as long as virtual machine metadata is stored in a standard, portable format, virtualization systems 112A and 112B may be different virtualization platforms from the same or different vendors, or may be different versions of a given virtualization platform.

In some cases, an encoding of two (or more) operating system images may be transported between (or accessible by) two or more alternative physical machines such that guest and host roles employed on a first machine can be swapped (or interchanged) when executed on an alternative machine. For example, such an encoding may support an office configuration in which a Microsoft Windows operating system hosts an OS X guest operating system, but supports a swapped role configuration in which the OS X guest operating system instance hosts the Microsoft Windows instance as guest operating system when copied, transported to or accessed from home (e.g., on removal media or through shareable storage).

Accordingly, FIG. 2 builds on the scenario(s) illustrated and described with reference to FIG. 1, but highlights an important class of exploitations in which an operating system role swap (or more generally, N-way permutation) may be effectuated on alternate underlying hardware. For example, two arrangements (201 and 202) are illustrated which are reminiscent of those described above, but which run on different underlying physical machines. In particular, arrangement 201, which includes virtualization system 212A and exposed virtual machines 213A and 213B, runs on a first underlying physical machine 225, while arrangement 202, which includes virtualization system 212B and exposed virtual machines 213C and 213D, runs on a second underlying physical machine 226.

As before, storage (222) encodes images of both operating system "A" and operating system "B." Also as before, the storage encodes virtual machine metadata that describes the configuration of relevant virtual machines (here, VM 213B exposed by virtualization system 212A and VM 213C exposed by virtualization system 212B). However, in recognition of the possibility that physical machines 225 and 226 may be physically separated (e.g., across the room, across town or across the country) and may or may not have access to the same underlying storage media, a pair of apparent storage volumes 222A and 222B are illustrated (from the perspective of each arrangement). The illustration is therefore consistent with shared access to a single storage volume, replication (e.g., using SAN or other technology), or even physical media transfer. Whatever the particular vector of transfer or shared access, each of the virtualization systems accesses a copy of operating system images that faithfully replicate state available to the other. Thus, an image of operating system "A" is available (typically at different times) for use (in arrangement 201) in booting and executing host operating system 115 on physical machine 225 or (in arrangement 202) in loading and executing guest operating system 118 on virtual machine 213C. Similarly, an image of operating system "B" is available for use (in arrangement 201) in loading and executing guest operating system 117 on virtual machine 213B or in booting and executing host operating system 116 on physical machine 226.

As noted, physical machines 225 and 226 may be dissimilar in configuration. Therefore, in some deployments consistent with FIG. 2, it may be desirable to configure a virtual machine of one arrangement to correspond to the physical machine of the other arrangement. Thus, virtual machine 213B exposed by virtualization system 212B may be configured to correspond to the configuration (e.g., type and numbers of processors virtualized, type of virtual network adapter, type of host bus adapter, etc.) of physical machine 226. Similarly, virtual machine 213C exposed by virtualization system 212A may be configured to correspond to the configuration of physical machine 225. Virtual machine metadata corresponding to each such virtual machine configuration may be encoded in storage 222.

Figure 2:
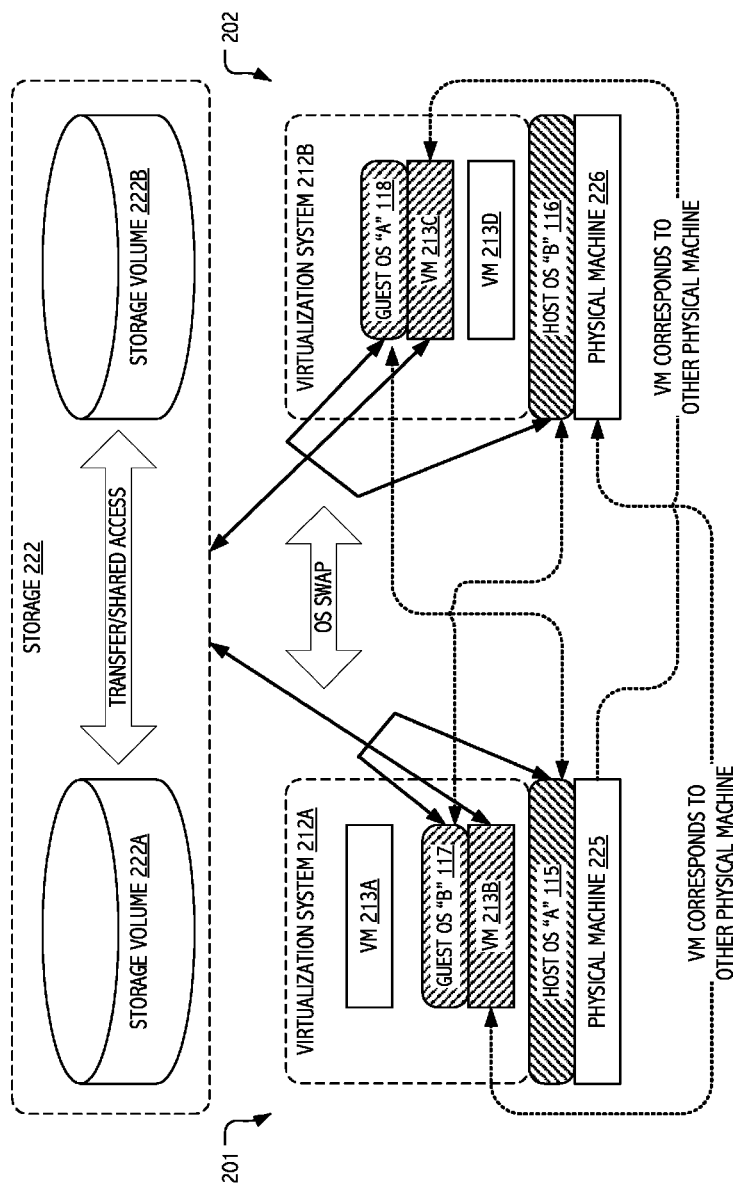
FIG. 2 illustrates one or more embodiments of the present invention in which a swap or interchange of guest and host operating system instances is performed as part of a transfer of operating system images between physical machines.
Figure 3:
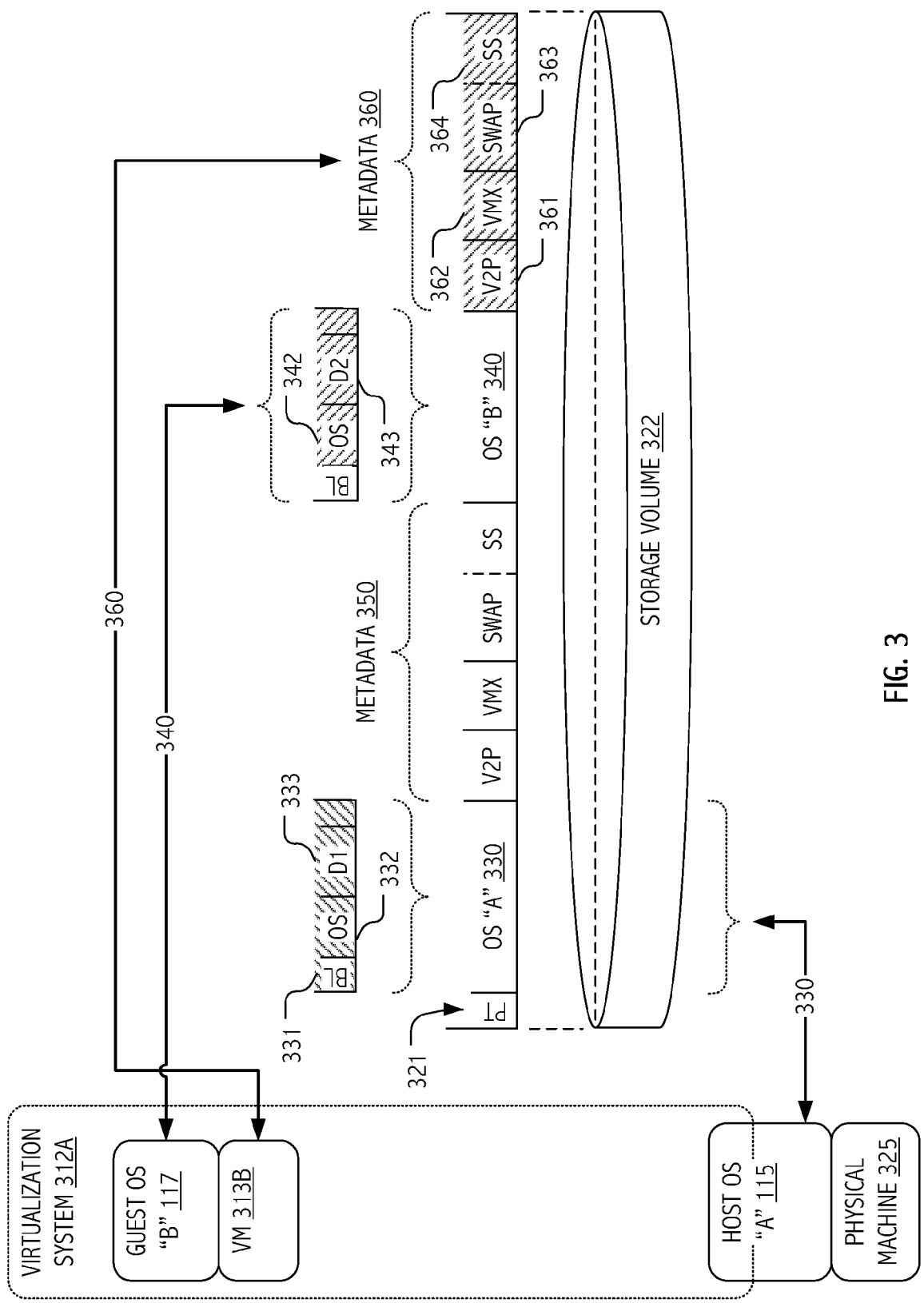
FIG. 3 depicts a storage volume that encodes both guest and host operating system instances and illustrates images and metadata used to support a first guest/host configuration in which operating system "A" executes as a host operating system and operating system "B" executes as a guest operating system on a virtual machine in accordance with one or more embodiments of the present invention.
Figure 4:
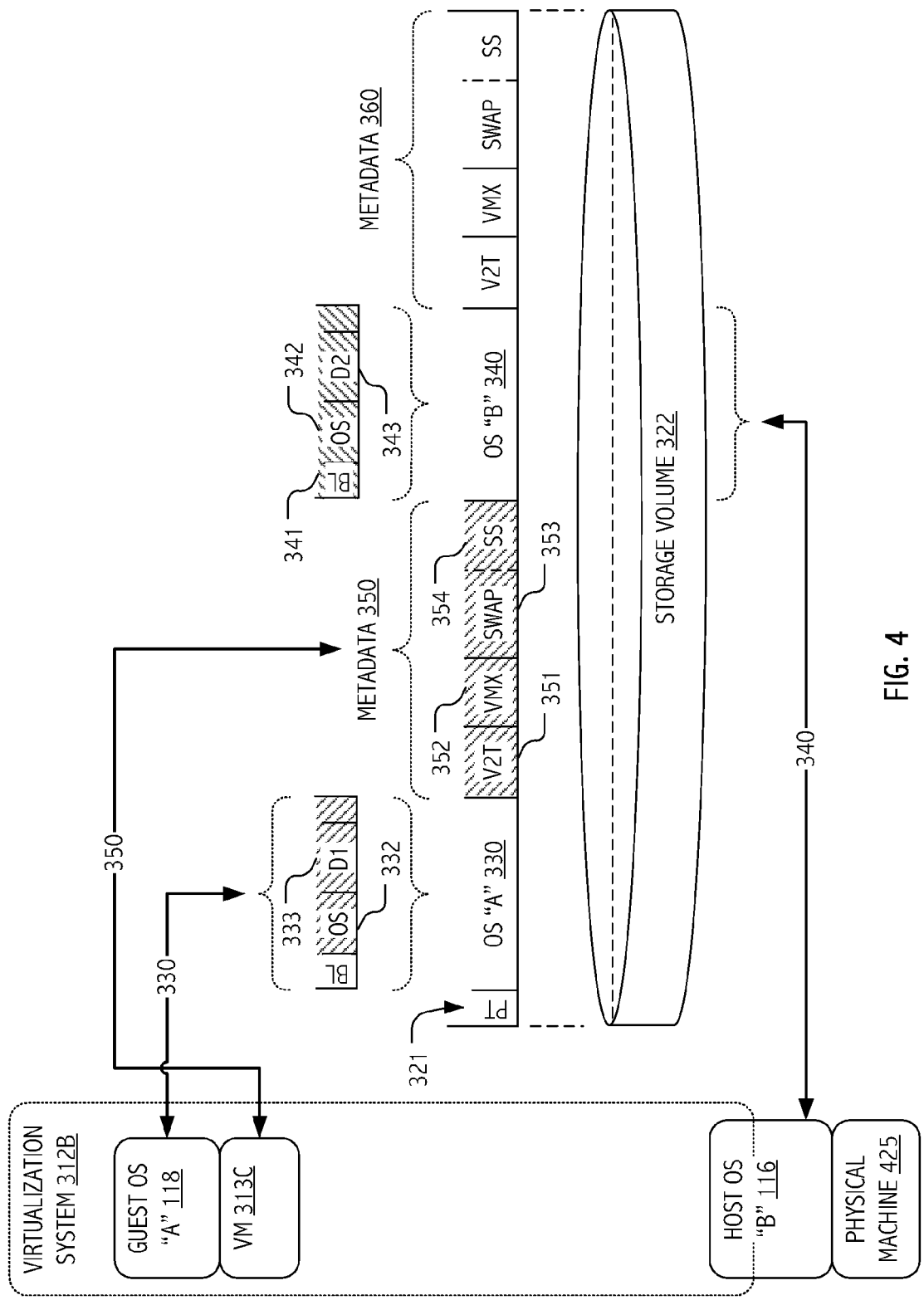
FIG. 4 illustrates the storage volume as used to support a second, swapped guest/host configuration in which operating system "B" instead executes as the host operating system and operating system "A" executes as a guest operating system in accordance with one or more embodiments of the present invention.

Turning now to FIGS. 3 and 4, certain exemplary storage encodings are illustrated for operating system images and virtual machine metadata in accordance with some embodiments of the present invention. FIG. 3 illustrates organization of illustrative information codings and use of particular information coded in a storage volume 322 consistent with arrangements 101 and 201 previously described (see FIGS. 1 and 2). FIG. 4 illustrates corresponding information and use of particular information consistent with arrangements 201 and 202. Thus, FIGS. 3 and 4 are intended to apply to deployments in which pre- and post-swap arrangements execute on same or different physical machines.

In FIG. 3, storage volume 322 encodes a partitioned storage extent that includes operating system image partitions 330 and 340 together with corresponding metadata partitions 350 and 360. An image of operating system "A" resides in partition 330 and supports execution of host operating system 115 on physical machine 325, while an image of operating system "B" resides in partition 340 and supports execution of guest operating system 117 on virtual machine 313B. Metadata partition 360 encodes configuration information for the virtual machine (313B) on which operating system "B" executes (or will execute) and, in the embodiment illustrated, storage for virtual machine 313B's backing state information and snapshot data, if supported.

Storage volume 322 includes a partition table 321, partition map or similar construct that identifies constituent partitions including e.g., partitions 330, 340 and 360. Metadata partition 350 (which will typically be identified in partition table 321 as well) encodes configuration information for a virtual machine (e.g., VM 113C or VM 213C, recall FIGS. 1 and 2) on which operating system "A" may execute post-swap or post-interchange. Since operating system "A" executes on a physical machine, metadata partition 350 is unused (or dormant) in arrangements corresponding to FIG. 3.

Partition 330 encodes an image 332 of operating system "A" suitable for booting physical machine 325 and typically includes a boot loader (BL) 331 in accordance with any operative requirements or conventions of operating system "A." Operating system boot loaders are well known in the art and boot loader 331 is of any suitable design. In the illustration of partition 330, two constituent elements OS and D1 are shown in which the operating system image and user data may respectively reside. Often, and in particular for Microsoft® Windows operating system deployments that follow standard partitioning schemes, a primary boot partition (illustrated as OS 332) encodes a "C: drive," where the operating system, user data, applications, and operating system page file all reside, although other common schemes may segregate certain data (e.g., user data) in a separate partition (illustrated as optional user data D1 333). Thus, if any such additional partition is employed, partition table 321 may individually identify partitions in which image 332 of operating system "A" user data D1 333 reside. In Unix-type operating systems, including BSD, Linux, Solaris® and even Mac OS X operating system, other partitioning schemes are typically employed. Accordingly, persons of ordinary skill in the art will readily understand that one or more partitions corresponding to partition 330 of FIG. 3 may be employed as partitions for /boot and /usr file systems that may be exposed to a Unix-type guest operating system or other partitions in accordance with requirements or conventions of another operating environment. For generality, partition 330 is referred to as the partition that encodes an image 332 of operating system "A."

Turning to those elements of storage volume 322 that support operating system "B," an analogous partition 340 encodes an image 342 of operating system "B" suitable for load and execution in connection with virtual machine 313B. As before, user data D2 343 (or other information) may optionally be represented in a separate partition if desired or if conventional for the particular operating system "B" deployed. Although an operating system boot loader (BL) is shown for partition 340 and operating system "B" image 342, the boot loader is typically unused (or dormant) in arrangements corresponding to FIG. 3 in which operating system "B" executes on a virtual machine (VM 313B), rather than a physical machine.

Metadata partition 360 encodes configuration data (VMX 362) that defines the hardware system virtualized by virtual machine 313B as well as a backing representation (SWAP 363) of state used by virtualization system 312A in its virtualization or emulation of resources of virtual machine 313B. Based on the particulars of virtual machine configuration data (e.g., type of processor virtualized, type of virtual network card, type of virtual storage host bus adapter (HBA), amount of memory virtualized, etc.), virtualization system 312A instantiates virtual machine 313B and exposes resources thereof to guest software, including the aforementioned guest operating system 117 and applications coordinated thereby. Exposed resources include virtual processor(s) including register states thereof, memory and paging spaces, virtual device and states thereof, etc. (as typical of virtualization systems known in the art), together with disk resources including at least operating system image 342 encoded in partition 340.

Backing representation SWAP 363 encodes execution state for virtual machine 313B at a particular time. For example, backing state data often includes an image (or other coding) of current data in all or a portion of a memory utilized by a virtual machine (e.g., instruction and/or value data in the virtual machine's RAM, cache, registers, etc.). Optionally, explicit or implicit snapshot (SS) data 364 may be encoded in connection with backing state data in metadata partition 360. Typically, snapshot data 364 will be maintained using facilities of a storage system (not separately shown) that transparently support snapshot, checkpointing, state cloning, rollback and/or other related operations without necessarily exposing underlying storage of data for incremental/successive states. For example, snapshot facilities available in modern commercial SANs are typically space efficient (employing copy-on-write and/or delta state technology) and typically provide transparent checkpointing and rollback support for a succession or hierarchy of states related to a baseline. Accordingly, snapshot data 364 is illustrated as an adjunct to backing state data 363, although other representations may be employed, if desired.

Metadata partition 360 also includes a virtual-to-physical (V2P) boot loader 361 that is employed to convert in-place image 342 for boot on a physical machine (e.g., the underlying physical machine 125 as in FIG. 1 or another physical machine 226 as in FIG. 2). If (or when) it is desirable to execute operating system "B" on a physical machine, rather than on virtual machine 313B, transformations can be initiated to conform or adapt information content of partition 340 (typically registry or other configuration state encoded in connection with operating system "B" image 342) to the particular needs or expectations of the hardware system. In some embodiments, virtual-to-target (V2P) boot loader 361 is introduced into metadata partition 360 and configured as a bootstrap vector for initiating such transformations such as detailed in commonly-owned, co-pending U.S. patent application Ser. No. 12/051,664, filed on Mar. 19, 2008, entitled "IN-PLACE CONVERSION OF VIRTUAL MACHINE STATE," and naming Hiltgen and Schmidt as inventors, which is incorporated herein by reference.

Accordingly, in some embodiments of the present invention, to initiate V2P transformations, metadata partition 360 is identified as a boot or load partition in accordance with operative conventions of the target system, and V2P boot loader 361 defines or identifies at least an initial sequence of operations that performs (or initiates performance) of the desired transformations. For example, in an illustrative system conforming to BIOS conventions originated for IBM-compatible personal computers running Microsoft Windows operating systems, a master boot record or MBR (which may appear as the first sector of storage volume 322) identifies (using an appropriate type code) metadata partition 360 as an active primary partition and is employed to initiate V2P boot loader 361 in accordance with a volume boot record encoded in a first sector of metadata partition 360. In other embodiments, another boot vector may be employed to initiate V2P boot loader 361.

A transformative sequence of operations is initiated regardless of which execution vector is employed. Exemplary transformative sequences are described in greater detail below; however, for simplicity of the initial description, two transformative aspects are typical. First, V2P boot loader 361 (either itself or through code that it directly or indirectly initiates) modifies partition table 221 of storage volume 322 to identify partition 340 and to flag boot loader 341 thereof as bootable. Second, if necessary, V2P boot loader 361 (either itself or through code that it directly or indirectly initiates) executes operating system specialization code to conform the operating system "B" image 342 with particulars of a target hardware machine. In some embodiments or situations, partition 340 may be encapsulated as a virtual disk (not separately shown) that is exposed to virtual machine 313B as a primary virtual disk including constituent sub-partitions for the operating system image and data (D2) 343. In such embodiments or situations, V2P boot loader 361 (either itself or through code that it directly or indirectly initiates) may also de-encapsulate operating system "B" image 342 and any optional data 343 for use by the target hardware machine.

In some embodiments, operating system specialization code modifies registry or other configuration data consistent with differences between virtual machine 313B and the target physical system, such as differing processor, memory or device configurations. Note that in support of some transitions from virtual to physical hardware, few if any modifications may be necessary. Indeed, in some exploitations or transitions, differences between configurations of virtual machine 313B and the physical machine may be insignificant or limited to variances for which a given operating system implementation is capable of self configuring, e.g., through plug-and-play or other auto configuration mechanism, on boot.

Of course, persons of skill in the art of bootstrap configurations will recognize that it is often useful to employ a cascade of boot or load sequences; each less constrained by coding space or other resource limits than its predecessor. Accordingly, the operational description herein of boot loaders include, and will be understood to encompass, one or more sequences of operations that may be triggered or initiated responsive to V2P boot loader 361, whether or not coded entirely within a particular coding extent such as within the first sector of metadata partition 360.

Thus, in an arrangement corresponding to FIG. 3, operating system "A" runs as a host operating system 115 on physical machine 325 drawing on the operating system image 332 encoded in partition 330. Virtualization software (e.g., any of the hosted virtualization software products of VMware, Inc.) runs as virtualization system 312A in coordination with host operating system 115. Virtualization system 312A exposes a virtual machine 313B based on definitions encoded in metadata partition 360, which runs an instance of operating system "B" as guest operating system 117 drawing on the operating system image 342 encoded in partition 340. V2P boot loader 361 encodes transformations, including operating system specialization if necessary, to prepare operating system image 342 for execution as a host operating system on physical machine 325 or some other physical target.

FIG. 4 illustrates storage volume 322 employed consistent with post-swap (or post-interchange) arrangement 102 or 202 previously described (recall FIGS. 1 and 2). As before, storage volume 322 encodes a partitioned storage extent that includes operating system image partitions 330 and 340 together with corresponding metadata partitions 350 and 360. The image of operating system "A" residing in partition 330 now supports execution of guest operating system 118 on virtual machine 313C, while the image of operating system "B" residing in partition 340 and supports execution of host operating system 116 on physical machine 425 which may be same as, or different from, physical machine 325. Metadata partition 350 encodes metadata for the virtual machine (313C) on which operating system "A" executes (or will execute) and, in the embodiment(s) illustrated, storage for virtual machine 313C's backing state information and snapshot data, if supported. Since operating system "B" executes on a physical machine, metadata partition 360 is unused (or dormant) in arrangements corresponding to FIG. 4. Storage volume 322 still includes a partition table 321, partition map or similar construct that identifies constituent partitions including e.g., partitions 330, 340, 350 and 360.

Partition 340 encodes image 342 of operating system "B" now suitable for booting physical machine 425 and includes a boot loader (BL) 341 in accordance with any operative requirements or conventions of operating system "B." As before, operating system boot loaders are well known in the art, and boot loader 341 is of any suitable design. An analogous partition 330 encodes an image 332 of operating system "A" now suitable for load and execution in connection with virtual machine 313C.

Metadata partition 350 encodes configuration data VMX 352 that defines the hardware system virtualized by virtual machine 313C as well as a backing representation (SWAP 353) of state used by virtualization system 312B in its virtualization or emulation of resources of virtual machine 313C. Based on the particulars of virtual machine configuration data, virtualization system 312B instantiates virtual machine 313C and exposes resources of underlying physical machine 325 to guest software, including the aforementioned guest operating system 118 and applications coordinated thereby. Metadata partition 350 also includes a virtual-to-physical (V2P) boot loader 351 that is employed to convert in-place image 332 for boot on a physical machine. If (or when) it is desirable to execute operating system "A" on a physical machine, rather than on virtual machine 313C, transformations can be initiated to conform or adapt information content of partition 330 (e.g., registry or other configuration state encoded in connection with operating system "A" image 332)

to the particular needs or expectations of the hardware system. As before, in some embodiments, virtual-to-physical (V2P) boot loader 351 is introduced into metadata partition 350 and configured as part of a bootstrap vector.

Thus, in an arrangement corresponding to FIG. 4, operating system "B" runs as a host operating system 116 on physical machine 325 drawing on the operating system image 342 encoded in partition 340. Virtualization software runs as virtualization system 312C in coordination with host operating system 116. Virtualization system 312B exposes a virtual machine 313C based on definitions encoded in metadata partition 350, which runs an instance of operating system "A" as guest operating system 118 drawing on the operating system image 332 encoded in partition 330. V2P boot loader 351 encodes transformations, including operating system specialization if necessary, to prepare operating system image 332 for execution as a host operating system on physical machine 425 or some other physical target.

Figure 5:
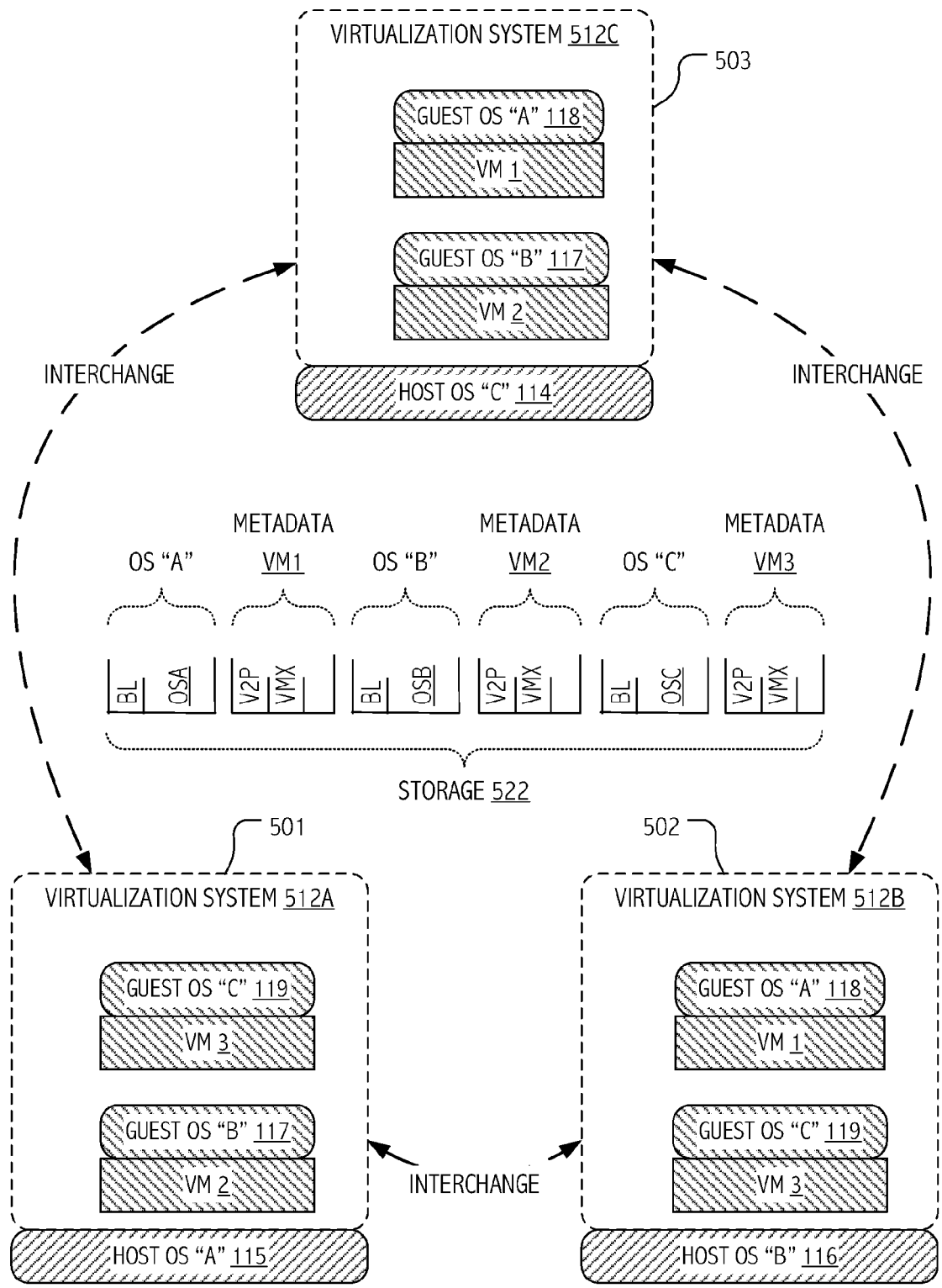
FIG. 5 illustrates guest/host role interchange amongst three operating system instances performed in accordance with one or more embodiments of the present invention.

Building on the forgoing, it will now be apparent that extension of these techniques to larger numbers of operating system (e.g., guest/host interchange amongst 3 or more operating system images) is straightforward. Indeed, FIG. 5 illustrates three guest/host permutations where virtualization systems 512A, 512B and 512C draw on operating system images and metadata encoded in partitions of storage extent 522. In particular, storage extent 522 encodes operating system images for three operating system instances (operating systems "A," "B," and "C") and metadata (defining virtual machines 1, 2 and 3) in a manner analogous to that described above with reference storage volume 322 to the two (2) operating system instance examples of FIGS. 1-4.

Thus, in arrangement 501, operating system "A" runs as a host operating system 115 drawing on operating system image OSA. Virtualization software runs as virtualization system 512A in coordination with host operating system 115, exposing two virtual machines (VMs 2 and 3) based on definitions encoded in respective metadata (see metadata VM2 and metadata VM3), which run instances of operating systems "B" and "C" as guest operating systems 117 and 119, respectively drawing on operating system images OSB and OSC. In arrangement 502, operating system "B" runs as a host operating system 116 drawing on operating system image OSB. Virtualization software runs as virtualization system 512B in coordination with host operating system 116, exposing two virtual machines (VMs 3 and 1) based on definitions encoded in respective metadata (see metadata VM3 and metadata VM1), which run instances of operating systems "C" and "A" as guest operating systems 119 and 118, respectively drawing on operating system images OSC and OSA. Finally, in arrangement 503, operating system "C" runs as a host operating system 114 drawing on operating system image OSC. Virtualization software runs as virtualization system 512C in coordination with host operating system 114, exposing two virtual machines (VMs 2 and 1) based on definitions encoded in respective metadata (see metadata VM2 and metadata VM1), which run instances of operating systems "B" and "A" as guest operating systems 117 and 118, respectively drawing on operating system images OSB and OSA. V2P boot loaders encode transformations, including operating system specialization if necessary, to prepare operating system images OSA, OSB and OSC for execution as a host operating system when previously executed as a guest operating system.

Figure 6:
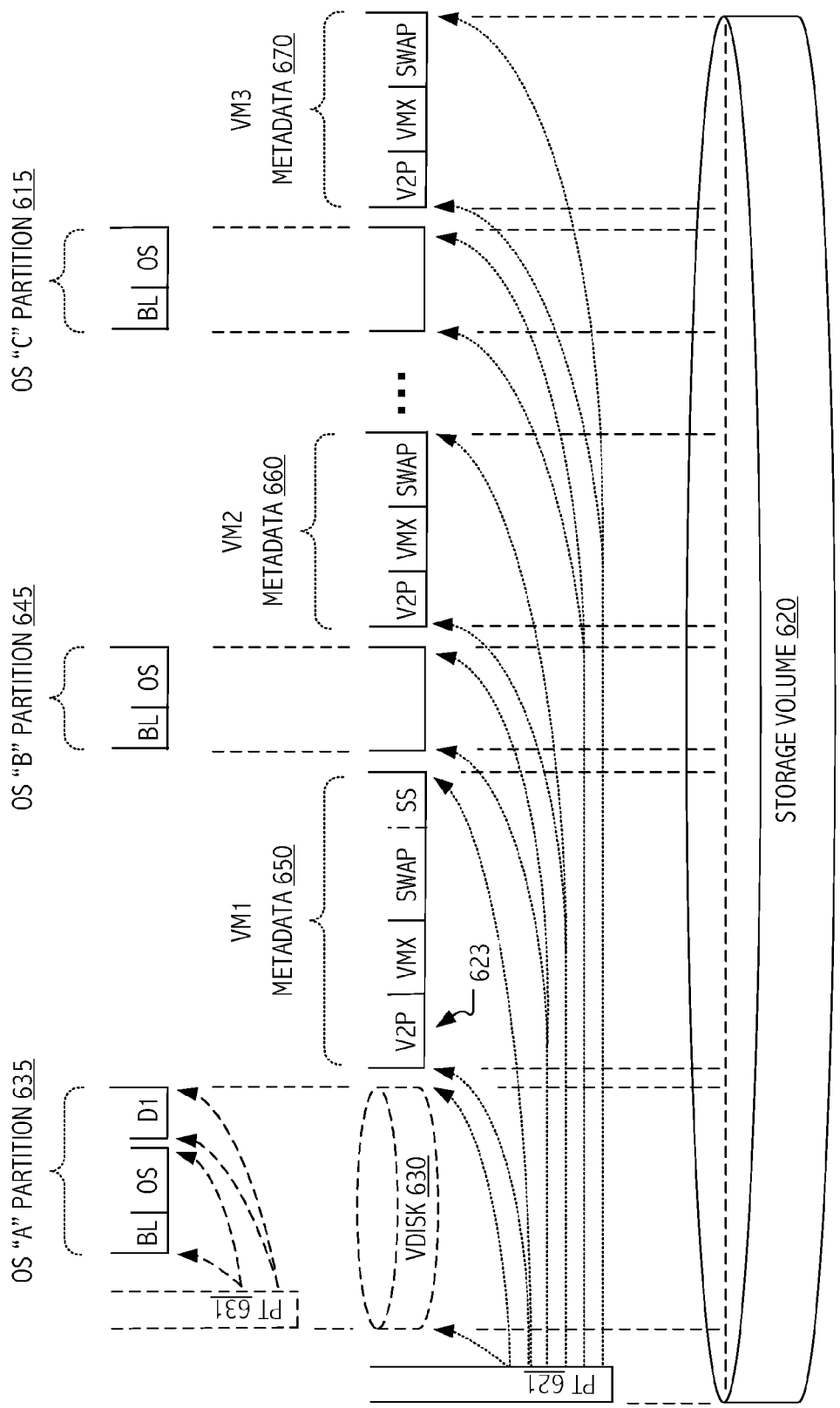
FIG. 6 illustrates a partitioned storage volume including operating system images and metadata suitable for use in one or more embodiments of the present invention in which three or more operating system instances are supported.

FIG. 6 illustrates a storage volume 622 that encodes three operating system images (e.g., for operating systems "A," "B" and "C") in respective partitions 635, 645 and 615 together with virtual machine metadata (650, 660 and 670) for use when individual ones of the operating system images execute in a guest operating system role. Much of the illustration of FIG. 6 will be understood with reference to the prior description of similar or related aspects of FIGS. 3 and 4, and for brevity, that discussion is not repeated here. Nonetheless, a few optional variations on the previous description are illustrated and further described.

First, partition table 621 is used to identify the various constituent first-level partitions of storage volume 622. In general, consistent with operative bootstrapping conventions, one of the first-level partitions will typically be identified using a master boot record, MBR (which may appear as the first sector of storage volume 622) or similar construct as a primary active partition. A boot loader defined in the identified partition defines or identifies at least an initial boot sequence of operations. If the desired host operating system previously executed as the host, that boot loader will typically be the boot loader (BL) coded with the host operating system image itself (e.g., boot loader 641 for operating system "B"). If the desired host operating system previously executed as a guest, then the boot loader will typically be a virtual-to-physical (V2P) boot loader coded with the virtual machine metadata (e.g., V2P boot loader 623 for operating system "A").

Second, as previously described, in some embodiments or situations, it may be desirable to encapsulate storage for an operating system image and related data in accordance with isolation goals. Thus, one of the first-level partitions is configured to encode information, including its own second-level partition table 631 in a way that encapsulates the information (including operating system "A" partitions 635 thereof) in a form suitable to exposure to a virtual machine as virtual disk 630. Although encapsulation and/or isolation techniques, such as those detailed in commonly-owned, co-pending U.S. patent application Ser. No. 11/960,524, filed Dec. 17, 2007, entitled "SECURING VIRTUAL MACHINE DATA," naming Hiltgen and Schmidt as inventors and incorporated herein by reference, are neither necessary nor essential, some embodiments of the present invention may optionally include such features if desirable. Accordingly, FIG. 6 illustrates encapsulation for one of the operating system images, namely operating system "A."

Figure 7A:
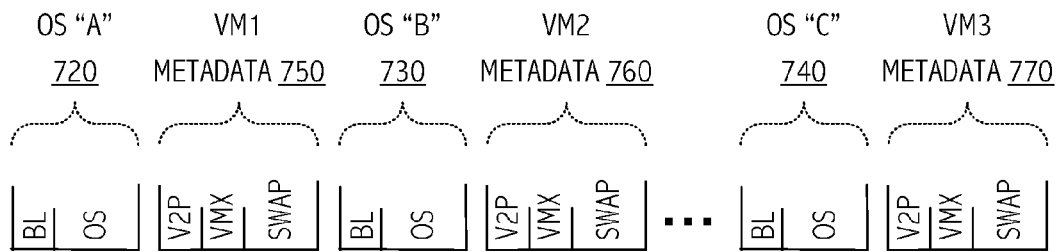
FIGS. 7A, 7B and 7C illustrate a variety alternative encodings for operating system images and metadata suitable for use in one or more embodiments of the present invention. In particular.
Figure 7B:
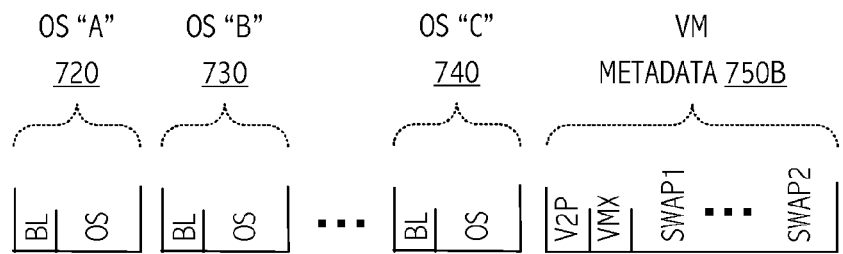
Figure 7C:
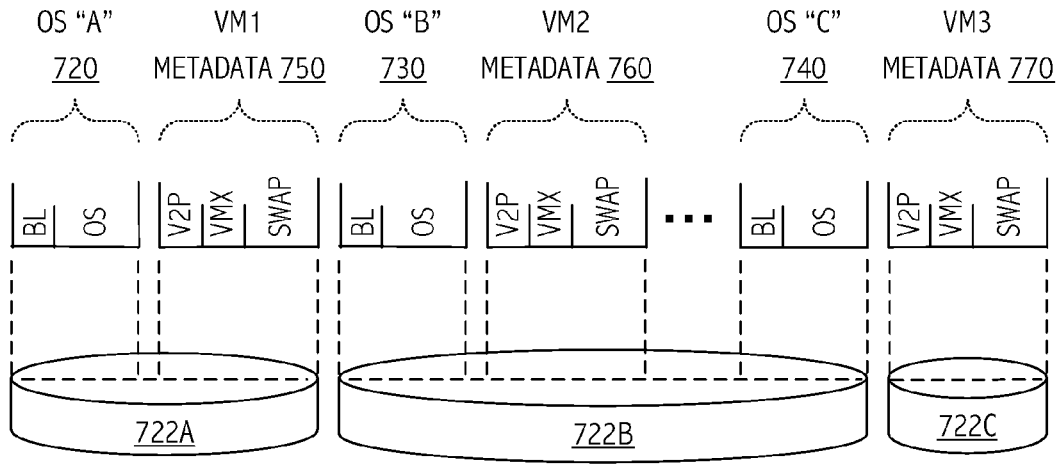

FIGS. 7A, 7B and 7C illustrate certain additional variations on encodings of operating system images and virtual machine metadata. FIG. 7A illustrates a basic configuration in which N (three or more) operating system images (OS "A," OS "B" . . . OS "C") are encoded in respective partitions 720, 730 . . . 740 together with respective metadata partitions 750, 760 . . . 770. In contrast, in FIG. 7B, a single metadata partition 750B is employed to support each operating system currently executing as a guest operating system. Finally, FIG. 7C illustrates distribution of the various previously introduced partitions across a set of storage volumes 722A, 722B and 722C.

Building on the preceding description, two exemplary sequences of operations are now illustrated. The first, illustrated in FIG. 8A, prepares an operating system image previously executed as a guest operating system for boot as a host operating system, whereas the second, illustrated in FIG. 8B, prepares an operating system image previously executed as a host for load onto a virtual machine as a guest. In some cases (e.g., a guest/host swap), a composite sequence that includes operations from both FIGS. 8A and 8B may be performed. Nonetheless, for generality and particularly with regard to encodings of three or more operating system images, the guest-to-host and host-to-guest sequences are separately illustrated.

Figure 8A:
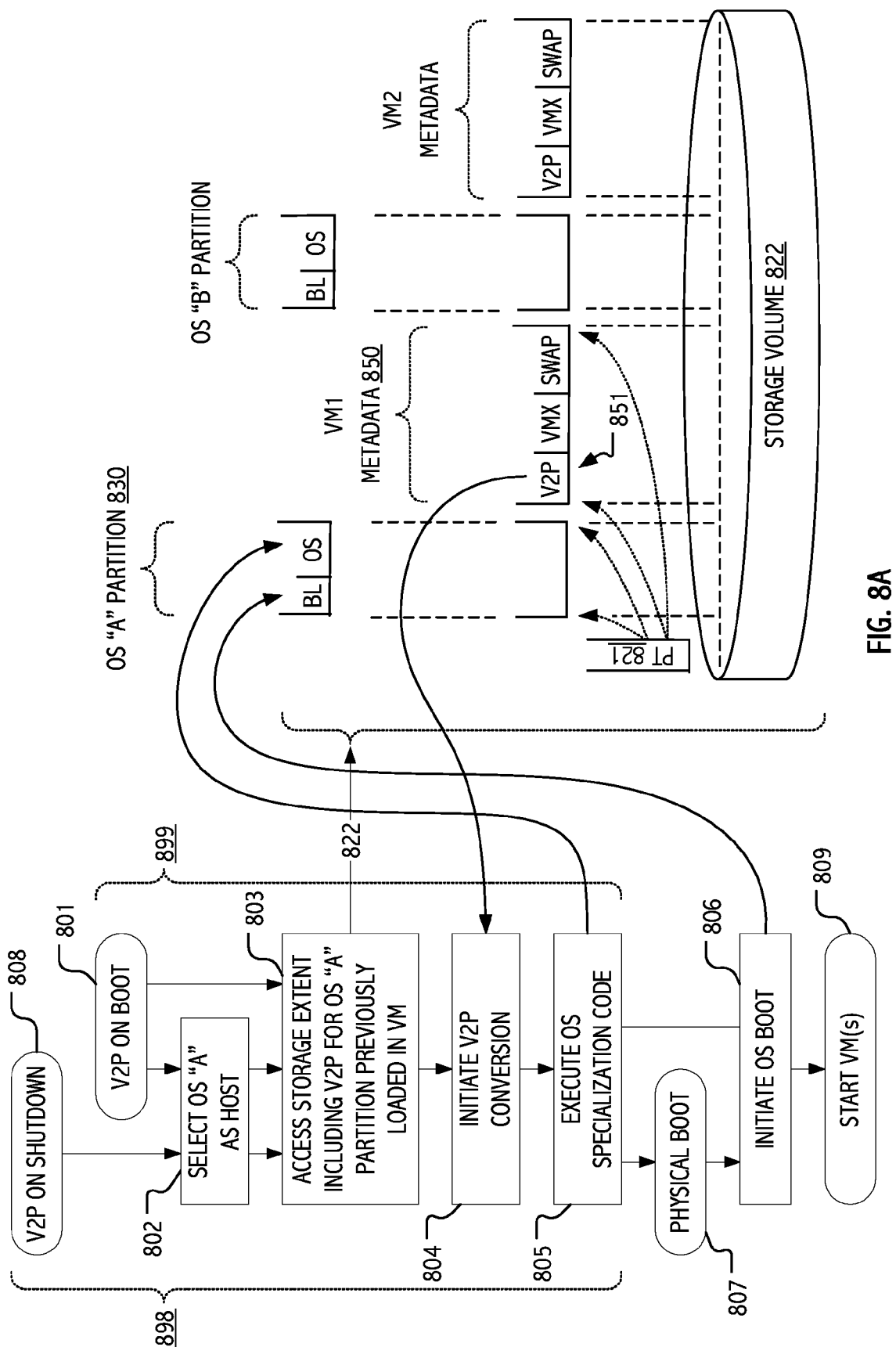
FIGS. 8A and 8B depict relationships between elements of an exemplary storage volume encoding and operations performed in furtherance of a guest/host interchange in accordance with one or more embodiments of the present invention.

Turning now to FIG. 8A, we begin (801) with a description that presumes virtual-to-physical (V2P) transformation on boot. In general, selection of operating system "A" for use as a host operating system can occur at any of a variety of times based on any of a variety of operations. For example, operating system "A" may have been selected at or after the shutdown of a virtual machine that previously executed operating system A as a guest. Selection may occur coincident with shutdown of another operating system that previously executed as host. Optionally, some facility (such as a multiboot manager may allow boot-time selection (e.g., at step 802) of a particular operating system image for boot.

Whatever the execution vector and timing of the V2P conversion, at step 803, the illustrated sequence accesses storage volume 822 which encodes an image (in partition 830 thereof) of operating system "A". Note that the image was previously executed as a guest operating on either the present or some other machine. Accordingly, at step 803, the illustrated sequence accesses a virtual-to-physical (V2P) conversion sequence 851 stored in metadata partition 850. In "V2P on boot" sequences in accord with the present description, the boot sequence is configured as V2P boot loader 851 and is identified in accordance with any operative convention as part of the boot sequence. For example, in accordance with certain exemplary partitioning and boot sequence conventions characteristic of BIOS originated for IBM-compatible personal computers running Microsoft Windows operating systems, a root partition table 821 may be configured to identify metadata partition 850 as a primary active (boot) partition and a V2P boot loader therein (e.g., 851) as an operative boot sequence. Typically, such a configuration would be established as part of a prior shutdown sequence and typically, placement of V2P conversion sequence 851 in an initial sector of storage that encodes the metadata partition will be sufficient to introduce the sequence as a V2P boot loader. Alternatively, a multiboot manager or some other mechanism may be employed to vector execution to V2P conversion sequence 851.

In any case, at step 804, V2P conversion is initiated and draws on the V2P conversion sequence 851 encoded in metadata partition 850. If necessary, at step 805, V2P conversion sequence 851 may execute operating system specialization code. In general, appropriate specializations are operating system specific; however, specializations typically include updates to registry or other configuration data consistent with differences between the configuration of the physical system on which V2P conversion sequence 851 is now executed and that of the previous virtual machine. For example, specialization for differing processor, memory and/or device configurations may often be appropriate. Typically, in migrations of Microsoft® Windows operating system deployments, updates to entries of the Windows Registry and installation (if necessary) of appropriate device drivers into the operating system image encoded in operating system "A" partition 830 may be coordinated using conventional setup and deployment facilities of the operating system itself. For example, persons of ordinary skill in the art of Windows® operating system deployments will be familiar with execution of the Windows setup manager (typically setupmgr.exe) and with execution sysprep-type utilities based on directives coded in a sysprep.inf file.

Thus, in some embodiments in accordance with the present invention, at step 805, operating system specializations are coded in accordance with conventional sysprep.inf syntax and execution is performed by initiating the sysprep utility with an appropriately populated sysprep.inf file and with referenced drivers (e.g., for mass storage devices, network adapters, etc. of the hardware machine) available for installation under control of the sysprep utility. In this way, the operating system image encoded in partition 830 may be re-specialized with appropriate drivers for the current physical system. If the physical system requires a different hardware abstraction layer than the previously executed virtual machine (e.g., if the target physical machine is a multiprocessor and the previously executed virtual machine was configured as a uniprocessor, or vice versa), the sysprep.inf file can include an appropriate UpdateHAL entry. Typical specializations may also include Active Directory domain memberships, IP addresses, etc.

Similar specializations may be applied in other operating system environments. In any case, once any appropriate operating system specialization is complete, boot of the resulting operating system image (e.g., that shown as image OS within partition 830) is initiated (at step 806), typically using an associated operating system boot loader (BL) coded therewith. Operating system boot loader BL is typically conventional and persons of ordinary skill in the art will appreciate a wide variety of suitable implementations.

As mentioned above, V2P conversion sequences akin to that just described may be initiated in any of a variety of manners and at any of a variety of times. For example (as illustrated by the collection 899 of operations and scenario just described), V2P conversion sequence 851 may be executed upon boot and embodied as a V2P boot loader. Alternatively, V2P conversion may be performed at another time, typically coincident with shutdown and prior to physical machine boot 807. V2P on shutdown (at step 808) is illustrated by collection 898 of operations. In such a configuration, V2P conversion need not be embodied in any boot sequence or loader and is performed prior to physical machine boot 807. In either case, boot of the operating system image (shown as OS within partition 830) is eventually initiated (806), typically using an associated operating system boot loader (BL) coded therewith. Thereafter, at step 809, virtual machines are started and appropriate operating system images loaded thereon.

Figure 8B:
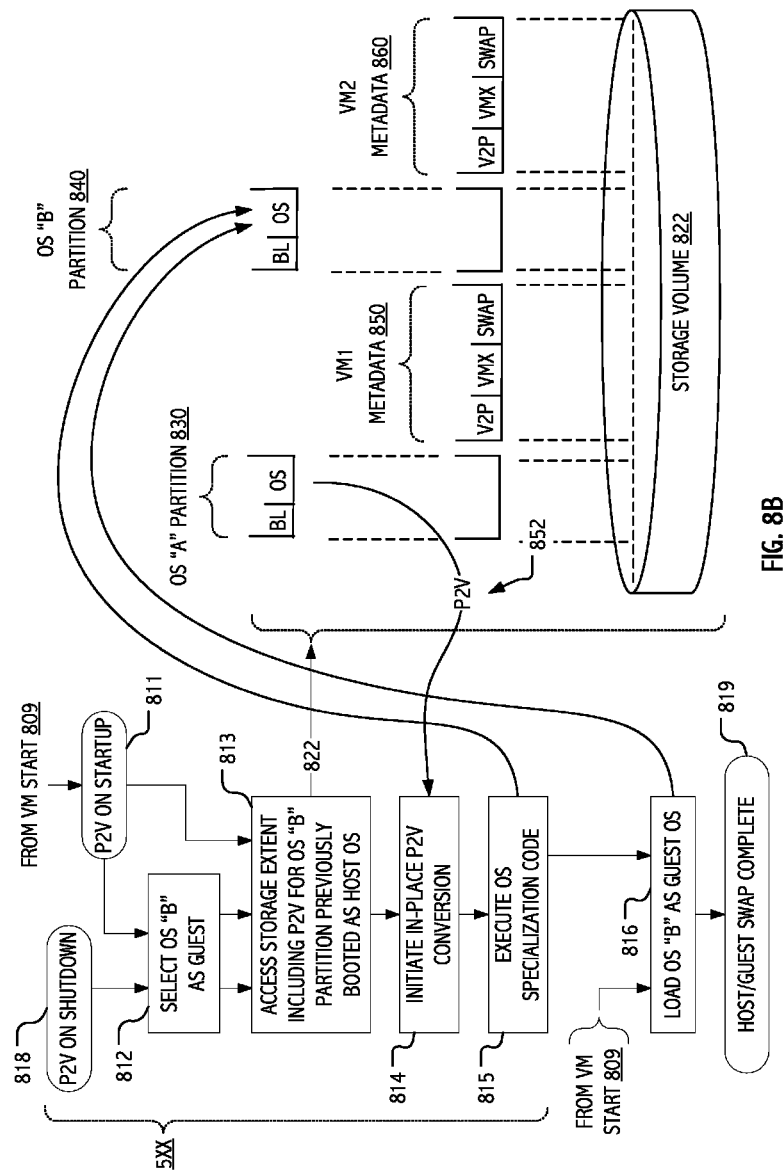

FIG. 8B illustrates preparation of an operating system image (e.g., that encoded in operating system "B" partition 840) that was previously executed as a host operating system. In particular, operating system "B" image is prepared for load onto a virtual machine as a guest. As with the guest-to-host conversion previously described, host-to-guest conversion may be on startup or at some other time such as upon (or coincident with) shutdown. More particularly, in the illustration of FIG. 8B, host-to-guest conversion converts from a form previously executed as a host operating system on the present (or some other) physical machine to a form suitable for execution as a guest operating system on a virtual machine.

This description initially presumes, for the sake of illustration, that physical-to-virtual (P2V) transformation coincident with virtual machine startup, at step 811. In general, selection of operating system "B" for use as a guest operating system can occur at any of a variety of times based on any of a variety of operations. For example, at step 812, operating system "B" may have been selected at or after the shutdown of a hardware machine that previously executed operating system "B" as a host. Optionally, some facility such as provided by a virtualization system itself may allow load-time selection (e.g., at step 812) of a particular operating system image for load as a guest.

Whatever the execution vector and timing of the P2V conversion, at step 813, the illustrated sequence accesses storage volume 822 which encodes an image (shown as OS within partition 840 thereof) of operating system "B". Note that the image was previously executed as a host operating system on either the present or some other physical machine. Accordingly, at step 813, the illustrated sequence accesses a physical-to-virtual (P2V) conversion sequence. In general, the P2V sequence may be stored in any of a variety of places including partition 830 (which encodes operating system "A" currently executing as the host), in a metadata partition (e.g., metadata partition 860) or elsewhere. For purposes of illustration and without loss of generality, at step 814, a situation is illustrated in which P2V conversion is initiated drawing on a P2V conversion sequence encoded with operating system "A" in partition 830.

As with the previously described V2P conversion, at step 815, a P2V sequence may execute operating system specialization code, if necessary or desired. Note that in some deployments, configurational differences between a virtual machine on which operating system "B" is to be executed and the physical machine on which operating system "B" is executed, may be insignificant. In such cases, or for operating system implementations that are capable of self-configuring to hardware (or to apparent hardware exposed through virtualization), at step 815, operating system specialization need not be performed.

As before, appropriate specializations are, in general, operating system specific; however, specializations typically include updates to registry or other configuration data consistent with differences between the configuration of the virtual machine on which operating system "B" will be executed and that of the physical machine on which operating system "B" was previously executed. For example, specialization for differing processor, memory and/or device configurations may often be appropriate. As with the previously described V2P conversion, in migrations of Microsoft® Windows operating system deployments, updates to entries of the Windows Registry and installation (if necessary) of appropriate device drivers into the operating system image encoded in operating system "B" partition 840 may be coordinated using conventional setup and deployment facilities of the operating system itself. For example, persons of ordinary skill in the art of Windows® operating system deployments will be familiar with execution of the Windows setup manager (typically setupmgr.exe) and with execution sysprep-type utilities based on directives coded in a sysprep.inf file.

Thus, in some embodiments in accordance with the present invention, at step 815, operating system specializations are coded in accordance with conventional sysprep.inf syntax and execution is performed by initiating the sysprep utility with an appropriately populated sysprep.inf file and with referenced drivers (e.g., for mass storage devices, network adapters, etc. of the virtual machine) available for installation under control of the sysprep utility. In this way, the operating system image encoded in partition 840 may be re-specialized with appropriate drivers for the target virtual machine. If the virtual machine requires a different hardware abstraction layer than the previously executed physical machine (e.g., if the target virtual machine is a multiprocessor and the previously executed physical machine was configured as a uniprocessor, or vice versa), the sysprep.inf file can include an appropriate UpdateHAL entry. As before, specializations may also include Active Directory domain memberships, IP addresses, etc.

As mentioned above, P2V conversion sequences akin to that just described may be initiated in any of a variety of manners and at any of a variety of times. For example, P2V conversion sequence 852 may be at or about the time of virtual machine startup, just prior to or coincident with load of operating system "B" as a guest, or at another time, such as coincident with, or after, a prior shutdown of operating system "B" running in a host operating system role. P2V on shutdown is illustrated by the sequence of operations from step 818 to optional execution of OS specialization code at step 815. In such a P2V on shutdown configuration, conversion is typically performed prior to virtual machine startup (see step 809). In any case, at step 816, load of the operating system image (shown as OS within partition 840) is eventually initiated. Thereafter at step 819, the host-to-guest role change is complete and, in scenarios in which a corresponding guest-to-host role change has also been performed (e.g., as illustrated in FIG. 8A), a host/guest swap is now complete.

Figure 9:
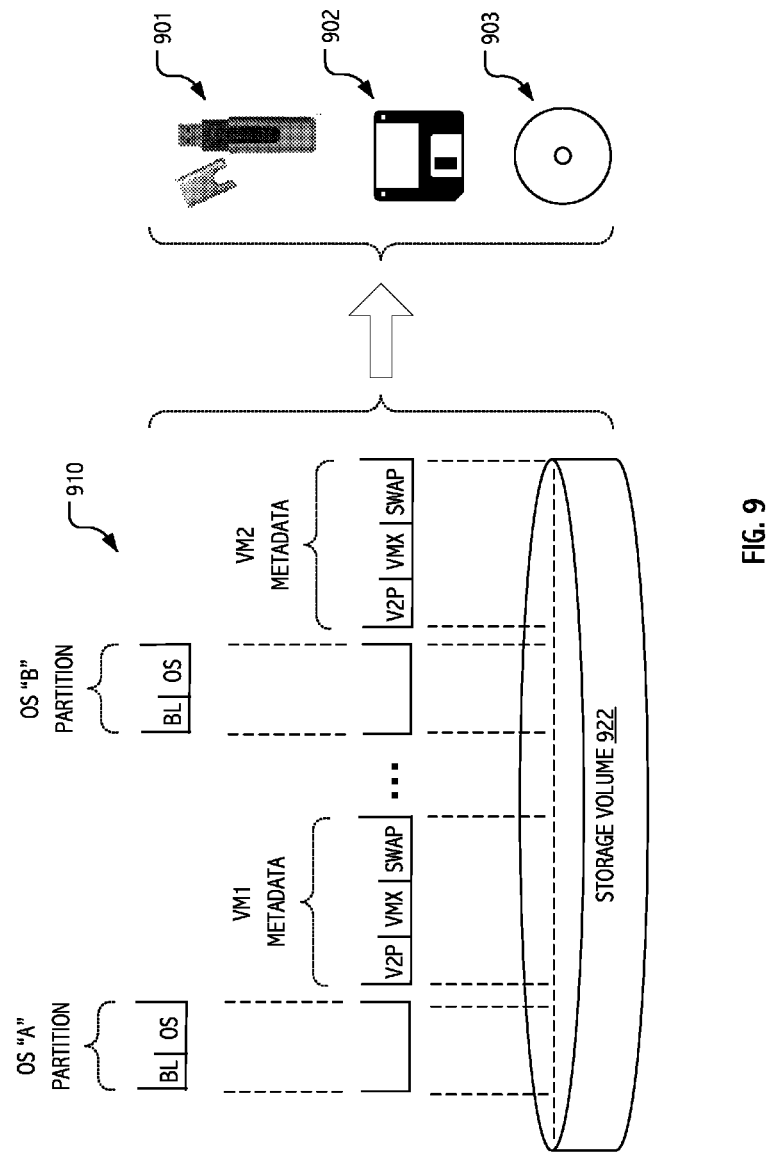
FIG. 9 depicts illustrative removable media encodings of the described encapsulated representations for transport to a target machine and use therewith as a boot or load image in accordance with one or more embodiments of the present invention.

FIG. 9 depicts illustrative removable media (901, 902, 903) encoded with a representation 910 of operating system images and virtual machine metadata as described herein suitable for transport to a target machine and for use therewith as a boot and/or load image. As described with regard to other embodiments, the representation 910 includes an encoding of two (2) or more operating system images for flexible guest/host role swap or interchange as described herein. In general, previously described transformations may be performed on the removable media encoding(s) themselves or on a copy transferred from the removable media to other media used by a target machine.

Virtualization System Technology and Variations

FIGS. 1-5 (which have been described in detail herein) depict computational systems in which embodiments of the present invention may be employed to swap or interchange guest and host operating system roles in a virtualization system. In general, embodiments of the present invention will be understood in the context of any of a variety of virtual machines (or virtual computers) that are presented or emulated within a virtualization system on underlying hardware facilities. Virtualization systems are well known in the art and include commercial implementations, such as VMware® ESX Server™, VMware® Server and VMware® Workstation, available from VMware, Inc., Palo Alto, Calif. and operating systems with virtualization support, such as Microsoft® Virtual Server 2005, and open-source implementations such as available from XenSource, Inc.

Although certain virtualization strategies/designs are described herein, virtualization systems 112A, 112B, 212A, 212B, 312A, 312B, 512A, 512B and 512C are representative of a wide variety of designs and implementations in which underlying hardware resources are presented to software (typically to operating system software and/or applications) as virtualized instances of computational systems that may or may not precisely correspond to the underlying physical hardware.

As is well known in the field of computer science, a virtual machine (VM) is a software abstraction—a "virtualization"—of an actual physical computer system. FIGS. 1-5 illustrate aspects of virtualization systems in accordance with some embodiments of the present invention. In an effort to emphasize features relevant to the inventive concepts, certain aspects of more complete virtualization system implementations have been abstracted.

In general, some interface is provided between the guest software within a VM and the various hardware components and devices in the underlying hardware platform. This interface—which can generally be termed "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms (when used in the art) do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself. Unless otherwise indicated, embodiments of the present invention may be used (and/or implemented) in (or in conjunction with) virtualized computer systems having any type or configuration of virtualization software.

In view of the above, and without limitation, an interface usually exists between a VM and the underlying platform which is responsible for actually executing VM-issued instructions and transferring data to and from the memory and storage devices or underlying hardware. Subject to the foregoing, certain commercially available virtualization systems employ a "virtual machine monitor" (VMM) in this role. A VMM is, in one or more embodiments, implemented as a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual I/O devices can be presented as part of previously described VMs (see FIGS. 1-5), in some virtualization system implementations, these "components" are at least partially implemented as constructs or emulations exposed to a VM by the VMM. One advantage of such an arrangement is that the VMM may be set up to expose "generic" devices, which facilitate VM migration and hardware platform-independence. In general, such functionality may be said to exist in the VM or the VMM.

Figure 10:
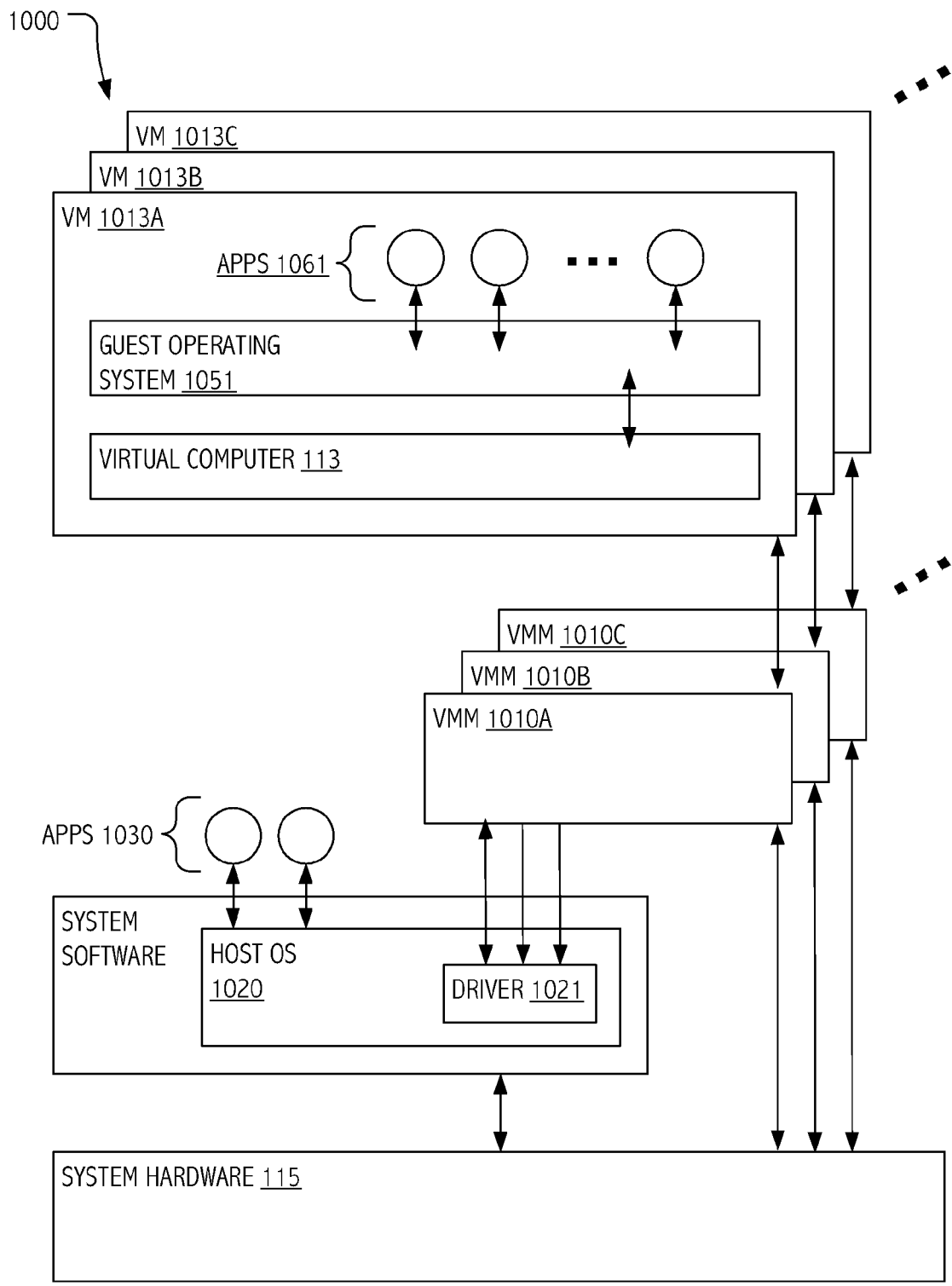
FIG. 10 depicts a functional block diagram of a virtualization system configuration in accordance with one or more embodiments of the present invention.

It should be noted that while VMMs can be viewed as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) execute in coordination with the host operating system. In a "hosted" configuration (such as illustrated in FIG. 10), an existing, general-purpose operating system (OS) acts as a "host" operating system that is used to perform certain I/O operations. In a "non-hosted" configuration, a kernel customized to support virtual computers takes the place of the conventional operating system.

Hosted Virtual Computers

FIG. 10 illustrates a virtualization system configuration 1000 commonly referred to as a "hosted" virtualized computer system in which a virtual machine monitor (e.g., VMM 1010, VMM 9100A, VMM 1010B) is co-resident at system level with the host operating system 1020 such that both the VMMs and the host operating system can independently modify the state of the host processor. VMMs call into the host operating system via driver 921 and a dedicated one of the user-level applications 930 to have the host OS perform certain I/O operations on behalf of the VM. The virtual computer in this configuration is thus hosted in that it runs in coordination with an existing host operating system. Virtualization systems that include suitable facilities are available in the marketplace. Indeed, VMware® Server virtual infrastructure software available from VMware, Inc., Palo Alto, Calif. implements a hosted virtualization system configuration consistent with the illustration of FIG. 9. VMware® Workstation desktop virtualization software, also available from VMware, Inc. also implements a hosted virtualization system configuration consistent with the illustration of FIG. 9.

Degrees of Virtualization

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, virtualized computer system-based realizations of the present invention are not restricted to use in systems with any particular "degree" of virtualization and is not to be limited to any particular notion of full or partial ("para-") virtualization.

While the invention(s) is (are) described with reference to various implementations and exploitations, it will be understood that these embodiments are illustrative and that the scope of the invention(s) is not limited to them. In general, virtual machines may be implemented consistent with hardware system now existing or hereafter defined. In addition, while the description of virtualization techniques has generally assumed that the virtual machines present interfaces consistent with a hardware system, persons of ordinary skill in the art will recognize that the techniques described may be used in conjunction with virtualizations that do not correspond directly to any particular hardware system.

Many variations, modifications, additions, and improvements are possible. For example, while particular boot sequencing and storage partitioning techniques characteristic of Microsoft® Windows operating system implementations on IBM-compatible personal computer designs have been described in detail herein, applications to other operating systems and computer systems will also be appreciated by persons of ordinary skill in the art. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of operating a computer system, the method comprising:
    selecting a first operating system image from amongst plural operating system images accessible to a hardware machine, wherein the first operating system image is stored in a first storage partition;
    booting the hardware machine using the first operating system image and executing code thereof as a host operating system;
    providing a virtualization environment and instantiating therein a virtual machine using first virtual machine configuration data descriptive of the first virtual machine, wherein the first virtual machine configuration data is stored in a second storage partition separately from the first operating system image; and
    loading, as a guest operating system executing within the virtual machine, a second operating system image selected from amongst the plural operating system images, and executing code thereof in connection with the instantiated virtual machine, wherein the second operating system image is stored in a third storage partition,
    wherein the first operating system image was previously loaded as a guest operating system instance and second virtual machine configuration data for a second virtual machine in which the first operating system image was previously loaded as the guest operating system instance is stored in a fourth storage partition separate from the first storage partition, and
    wherein the fourth storage partition storing the second virtual machine configuration data associated with execution of the guest operating system instance in the second virtual machine while the first operating system image was previously loaded as the guest operating system instance is isolated from the first operating system image used to boot the hardware machine.

2. The method of claim 1, further comprising:
swapping the guest and host operating systems.

3. The method of claim 1,
wherein each of the operating system images being loaded as either the host operating system or the guest operating system.

4. The method of claim 1, further comprising:
prior to the selecting, loading the first operating system image and executing code thereof as the guest operating system instance.

5. The method of claim 1, further comprising:
prior to the selecting, booting the hardware machine using the second operating system image and executing code thereof as a host operating system instance.

6. The method of claim 1,
wherein the operating system images number at least two (2); and
further comprising performing an in-place conversion of either or both of the first and second operating system images.

7. The method of claim 1,
wherein the operating system images number at least three (3); and
wherein neither the host operating system boot nor the first virtual machine load requires in-place conversion of a corresponding one or the operating system images.

8. The method of claim 1, further comprising:
swapping of host and guest operating system instances, in part, by performing an in-place conversion of a corresponding one of the first and second operating system images.

9. The method of claim 1,
wherein the second operating system image was previously booted as a host operating system instance and is loadable as the guest operating system instance without access to information stored in the first operating system image.

10. A computer system comprising:
one or more computer processors; and
a computer-readable storage medium comprising instructions, that when executed, control the one or more computer processors to be configured for:
booting from a first operating system image stored in a first storage partition to host virtualization software that is itself executable to support a first virtual machine using first virtual machine configuration data and to load therein, from a second operating system image stored in a second storage partition, a guest operating system, wherein the first virtual machine configuration data is stored in a third storage partition separate from the second storage partition, wherein the first operating system image was previously loaded as a guest operating system instance in a second virtual machine and second virtual machine configuration data associated with execution of the first operating system image when loaded as the guest operating system instance in a second virtual machine is stored in a fourth storage partition separate from the first storage partition, and wherein the fourth storage partition storing the second virtual machine configuration data is isolated from the first operating system image that is booted on the computer system, and wherein the second operating system image was previously used as a host operating system instance to boot the computer system and the third storage partition storing the first virtual machine configuration data is isolated from the second operating system image when previously used as the host operating system, and wherein the second operating system image is loadable as the guest operating system instance without access to information encoded in the first operating system image.

11. The computer system of claim 10, further comprising:
storage that encodes the first and second operating system images.

12. The computer system of claim 10, further comprising:
a partitioned storage extent that encodes the first and second operating system images in respective first and second storage partitions thereof; and
a metadata partition in the fourth storage partition that encodes a virtual hardware description for the virtual machine and virtual-to-physical (V2P) instructions executable to modify a partition table of the storage extent to include an operating system (OS) boot loader associated with the first operating system image in a boot sequence of the computer system.

13. The computer system of claim 12,
wherein the virtual-to-physical (V2P) instructions are encoded in the metadata partition as a V2P boot loader.

14. The computer system of claim 12,
wherein the virtual-to-physical (V2P) instructions are executable to perform an in-place conversion of the first operating system image.

15. A method comprising:
representing in a storage extent, a first operating in a first storage partition and a second operating system image stored in a second storage partition together with a first metadata storage partition that includes a virtual hardware description and a virtual-to-physical (V2P) boot loader that is stored separately from the second storage partition;
booting a first hardware machine from the first operating system image and executing code thereof as a host for a virtualization environment;
instantiating a first virtual machine in the virtualization environment based on the virtual hardware description and loading the second operating system image in the first virtual machine as a guest; and
after shutdown of the first virtual machine, executing the V2P boot loader to modify a partition table of the storage extent to identify an OS boot loader associated with the second operating system image as bootable and to thereafter boot therefrom, wherein the partition table identifies virtual machine configuration data stored in first metadata storage partition that is associated with execution of the second operating system image in the first virtual machine separately from the second storage partition storing the second operating system image that is used to boot therefrom to allow isolation of the virtual machine configuration data stored in the first metadata storage partition from the second operating system image that is used to boot therefrom.

16. The method of claim 15,
selecting from amongst at least the first and second operating system images using a multi-boot manager.

17. The method of claim 15, further comprising:
booting from the second operating system image using the OS boot loader.

18. The method of claim 17, further comprising:
wherein the booting from the second operating system image is performed on a second hardware machine.

19. The method of claim 18, further comprising:
encoding at least the second operating system image and the first metadata partition in a removable media portion of the storage extent; and
transporting the removable media to the second hardware machine.

20. The method of claim 17,
wherein the booting from the second operating system image is performed on first hardware machine.

21. The method of claim 20, further comprising:
loading the first operating system image as a guest.

22. The method of claim 15, further comprising:
instantiating at least a second virtual machine in the virtualization environment and loading a third operating system image therein as a guest.

23. The method of claim 15, further comprising:
representing an additional third operating system image in the storage extent together with a second metadata partition that includes a virtual hardware description and a second virtual-to-physical (V2P) boot loader; and
loading the third operating system image as a guest; and
thereafter executing the second V2P boot loader to modify the partition table of the storage extent to identify an OS boot loader associated with the third operating system image as bootable and to thereafter boot therefrom.

24. The method of claim 15,
wherein the V2P boot loader at least initiates an in-place transformation of the second operating system image.

25. The method of claim 15, further comprising:
prior to the loading of the second operating system image as a guest, performing an in-place, physical-to-virtual (P2V) transformation thereof.

26. A non-transitory computer readable storage media encoding comprising:
first and second operating system images encoded in respective first and second storage partitions of a storage extent, the first and second operating system images interchangeable as host and guest operating system instances executing in coordination with a virtualization system on a hardware machine; and
a metadata storage partition that includes a virtual hardware description for a virtual machine instantiable in the virtualization system and a virtual-to-physical (V2P) boot loader code executable as part of a boot sequence for the hardware machine to modify a partition table of the storage extent to identify as bootable the storage partition encoding a particular one of the first and second operating system images previously loaded as a guest operating system instance, wherein the partition table identifies virtual machine configuration data stored in the metadata storage partition associated with execution of the guest operating system instance in the virtual machine separately from the respective first and second storage partitions storing the encoded particular one of the first and second operating system images that is identified as bootable to allow isolation of the virtual machine configuration data stored in the metadata storage partition from the encoded particular one of the first and second operating system images that is identified as bootable.

27. The non-transitory computer readable storage media encoding of claim 26, wherein the V2P boot loader code is further executable to at least initiate an in-place transformation of the particular operating system image previously loaded as a guest operating system instance.

28. The non-transitory computer readable storage media encoding of claim 27, wherein the partition that encodes the particular operating system image previously loaded as a guest operating system instance also includes a corresponding operating system registry or system configuration database, and wherein the in-place transformation includes modification of the operating system registry or system configuration database to correspond to the hardware machine rather than the virtual machine.

29. The non-transitory computer readable storage media encoding of claim 26, wherein at least a portion of the storage extent is accessible, transportable or transmittable to another hardware machine.

30. The non-transitory computer readable media storage encoding of claim 26, wherein the non-transitory computer readable media storage resides in one or more storage volumes provisioned from and maintained as a storage unit of a storage area network (SAN), of network attached storage (NAS) or storage interfaced using a small computer systems interface over TCP/IP (iSCSI) protocol.

31. A method of operating a computational system, the method comprising:
    simultaneously encoding multiple operating system images within a storage extent, wherein at least a first one of the images encodes an operating system stored in a first storage partition of the storage extent most recently executed as a guest, and at least a second one of the operating system images stored in a second storage partition of the storage extent encodes an operating environment most recently executed as a host;
    performing an in-place transformation of at least one of the first and second operating system images;
    booting a hardware machine using the first operating system image as a host and instantiating a virtual machine therein, wherein first virtual machine configuration data associated with previous execution of the first operating system image in the guest is stored in a third storage partition of the storage extent, and wherein the first virtual machine configuration data stored in the third storage partition is isolated from the first operating system image that is stored in the first storage partition and used in booting the hardware machine; and
    loading the virtual machine using the second operating system image as a guest operating environment using second virtual machine configuration data stored in a fourth storage partition separate from the second operating system image stored in the second storage partition.

32. The method of claim 31, further comprising:
    introducing into the storage extent, prior to the booting, a virtual-to-physical (V2P) boot loader that defines a sequence of instructions executable by the hardware machine to at least initiate an in-place transformation of the first image.

33. The method of claim 31, further comprising:
    prior to the booting, introducing into the storage extent a virtual-to-physical (V2P) boot loader that defines a sequence of instructions executable by the hardware machine to at least initiate in-place transformation of the first image.

34. The method of claim 31, further comprising:
    performing in-place transformation of the first image coincident with shutdown of a guest operating system instance thereof.

35. The method of claim 31, further comprising:
    encoding the first and second images in respective first and second storage partitions of the storage extent; and
    encoding a metadata partition within the third storage partition of the storage extent, the metadata partition including a virtual hardware description for the virtual machine and a virtual-to-physical (V2P) boot loader executable as part of the booting to modify a partition table to identify as bootable the partition that encodes the first image.

36. The method of claim 35,
    wherein the V2P boot loader is further executable to at least initiate in-place transformation of the first image.

37. A computer system comprising:
    one or more computer processors; and
    a computer-readable storage medium comprising instructions, that when executed, control the one or more computer processors to be configured for:
    booting from individual ones of a plurality of operating system images stored in respective storage partitions to host virtualization software that is itself executable to support a first virtual machine using first virtual machine configuration data and to load therein, from at least one other one of the operating system images, a guest operating system, wherein the first virtual machine configuration data is stored in a configuration data storage partition separate from the respective storage partitions, and wherein the computer system facilitates swap of host and guest operating system instances, in part, by performing an in-place conversion of a corresponding one of the operating system images, wherein the first virtual machine configuration data stored in the configuration data storage partition associated with execution of one of the operating system images as the guest operating system instance is isolated from the one of the operating system images after performing of the in-place conversion.

38. The computer system of claim 37, further comprising:
    a virtual to physical (V2P) transformation sequence executable to transform a particular one of the operating system images which was previously loaded as the guest operating system instance, the V2P transformation sequence executable to convert the particular image for execution as the host operating system.

39. The computer system of claim 38, further comprising:
    a boot loader defining a sequence of instructions executable by the computer system to at least initiate the V2P transformation sequence prior to startup of the host operating system.

40. The computer system of claim 38,
    wherein the V2P transformation sequence is executable under control of the virtualization system and coincident with shutdown of the guest operating system instance.

41. The computer system of claim 37, further comprising:
    storage that encodes the plurality of operating system images.

42. A computational system comprising:
    a hardware machine capable of executing a host operating system;
    virtualization software executable in connection with the host operating system to support at least one virtual machine and a guest operating system executable therein; and
    a storage extent that encodes in respective separate storage partitions thereof, operating system images each suitable for instantiation as either the host operating system or the guest operating system, the storage extent further encoding, separate from the operating system image partitions, a configuration storage partition storing a description of virtual machine configuration data associated with execution of the virtual machine and a virtual-to-physical (V2P) boot loader executable by the hardware machine to modify a partition table of the storage extent to include in a boot sequence of the hardware machine, an operating system (OS) boot loader associated with one of the operating system images most recently executed as a guest operating system, wherein the partition table identifies the configuration storage partition storing the virtual machine configuration data associated with execution of the virtual machine including one of the operating system images most recently executed as a guest operating system separately from the operating system image that is used in the boot sequence to allow isolation of the configuration storage partition storing the virtual machine configuration data from the operating system image that is used in the boot sequence.

43. A computer program product encoded in one or more non-transitory computer readable storage media, the product comprising:

virtual-to-physical (V2P) boot loader code executable to modify a partition table of a storage extent to include in a boot sequence of a hardware machine, an operating system (OS) boot loader associated with an operating system image stored in a first storage partition of the storage extent most recently executed as a guest operating system;

the V2P boot loader code introducible into an encapsulation of virtual machine state, wherein the V2P boot loader defines at least one in-place transformation to be performed on the encapsulation by the hardware machine to allow the hardware machine to boot from the virtual machine state, wherein the partition table identifies virtual machine configuration data stored in a second storage partition of the storage extent associated with the operating system image most recently executed as the guest operating system as separate from a third storage partition storing the operating system image that is used to boot the hardware machine to allow isolation of the second storage partition storing the virtual machine configuration data from the operating system image that is used to boot the hardware machine.

44. The computer program product of claim 43, encoded in at least one non-transitory computer readable storage medium selected from the set of a disk, tape or other magnetic, optical or electronic storage medium.

* * * * *